US006157381A

United States Patent [19]
Bates et al.

[11] Patent Number: 6,157,381
[45] Date of Patent: Dec. 5, 2000

[54] COMPUTER SYSTEM, USER INTERFACE COMPONENT AND METHOD UTILIZING NON-LINEAR SCROLL BAR

[75] Inventors: Cary L. Bates; Paul R. Day, both of Rochester, Minn.

[73] Assignee: International Business Machines Corporation, Armonk, N.Y.

[21] Appl. No.: 08/972,608

[22] Filed: Nov. 18, 1997

[51] Int. Cl.[7] ................................................. G06F 3/14
[52] U.S. Cl. ........................ 345/341; 345/340; 345/123; 345/973
[58] Field of Search ................................. 345/341, 340, 345/123, 333, 334, 973, 974

[56] References Cited

U.S. PATENT DOCUMENTS

| | | | |
|---|---|---|---|
| 5,075,673 | 12/1991 | Yanker | 340/710 |
| 5,122,785 | 6/1992 | Cooper | 340/710 |
| 5,196,838 | 3/1993 | Meier et al. | 340/724 |
| 5,202,961 | 4/1993 | Mills et al. | 395/159 |
| 5,313,229 | 5/1994 | Gilligan et al. | 345/157 |
| 5,339,391 | 8/1994 | Wroblewski et al. | 395/157 |
| 5,371,846 | 12/1994 | Bates | 395/157 |
| 5,374,942 | 12/1994 | Gilligan et al. | 345/157 |
| 5,473,344 | 12/1995 | Bacon et al. | 345/163 |
| 5,494,566 | 2/1996 | Kwatinetz | 395/157 |
| 5,506,951 | 4/1996 | Ishikawa | 395/157 |
| 5,526,480 | 6/1996 | Gibson | 395/154 |
| 5,528,260 | 6/1996 | Kent | 345/123 |
| 5,530,455 | 6/1996 | Gillick et al. | 345/163 |
| 5,532,715 | 7/1996 | Bates et al. | 345/123 |
| 5,550,969 | 8/1996 | Torres et al. | 395/159 |
| 5,553,225 | 9/1996 | Perry | 395/157 |
| 5,633,657 | 5/1997 | Falcon | 345/145 |
| 5,680,561 | 10/1997 | Amro et al. | 345/341 |
| 5,850,531 | 12/1995 | Cox et al. | 345/349 |

OTHER PUBLICATIONS

Class specification for java.awt.Scrollbar, Java Development Kit 1.2, Sun Microsystems (1997).
"New Common User Access Control: Pushpad for Greater Mouse Productivity", *IBM® Technical Disclosure Bulletin*, vol. 37, No. 08, (Aug. 1994), pp. 497–499.
Speed–Sensitive Scroll Widgets, *IBM® Technical Disclosure Bulletin*, vol. 38, No. 01, (Jan. 1995), pp. 483–484.
"Part 1 Your First Day at the Office", *Getting Results with Microsoft® Office 97 Real World Solutions for the Work You Do*, Microsoft Corporation, (1995–96), pp. 62–65, 74–75, and 78–80.
U.S. Department of Commerce Patent and Trademark Office, *Automated Patent System (APS) Workstation Quick Reference Guide for the Third Generation Workstation (3GWS)*, APS–TR–TRG–30–05.03, (Mar. 27, 1996).
"Delrina 7.0 WinFax Pro Getting Started Guide", *Getting Started Basics*, (Apr. 1996), p. 5–11.

*Primary Examiner*—Raymond J. Bayerl
*Assistant Examiner*—Cuong T. Thai
*Attorney, Agent, or Firm*—Wood, Herron & Evans, L.L.P.

[57] ABSTRACT

A computer system, user interface component and method utilize a non-linear scroll bar to provide variable mappings between a scroll bar and different portions of a document, and/or between a scroll bar and different subranges of a range of values selectable by the scroll bar. As a result, a scroll bar may be configured to vary the relative scroll rate of a portion of a document to either emphasize or de-emphasize that portion relative to other portions of the document. Generally, emphasized portions of a document are allocated a relatively larger portion of a scroll bar (i.e., with a relatively lower scroll rate), such that navigation to and within such portions is facilitated relative to other portions of the document.

55 Claims, 12 Drawing Sheets

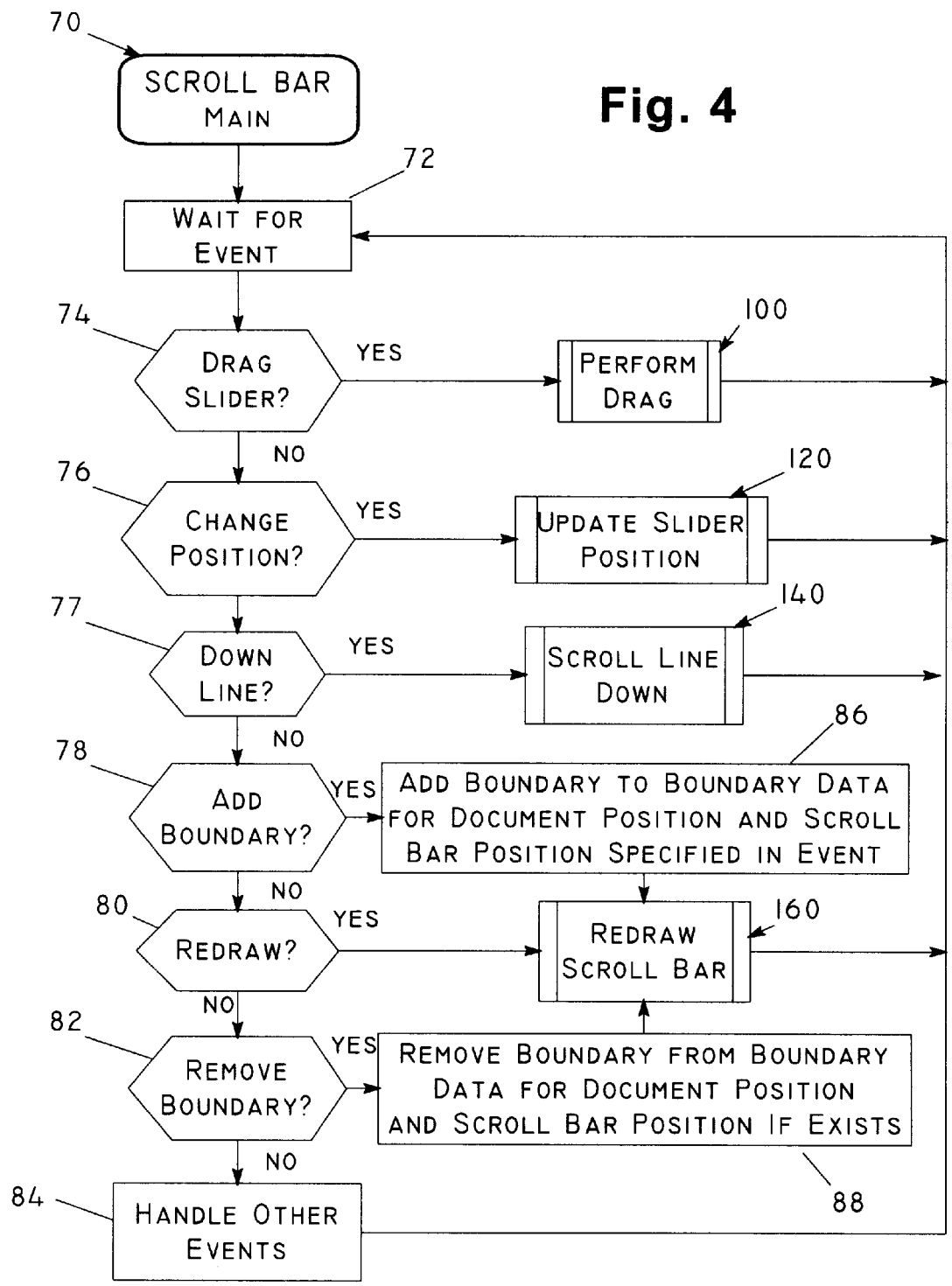

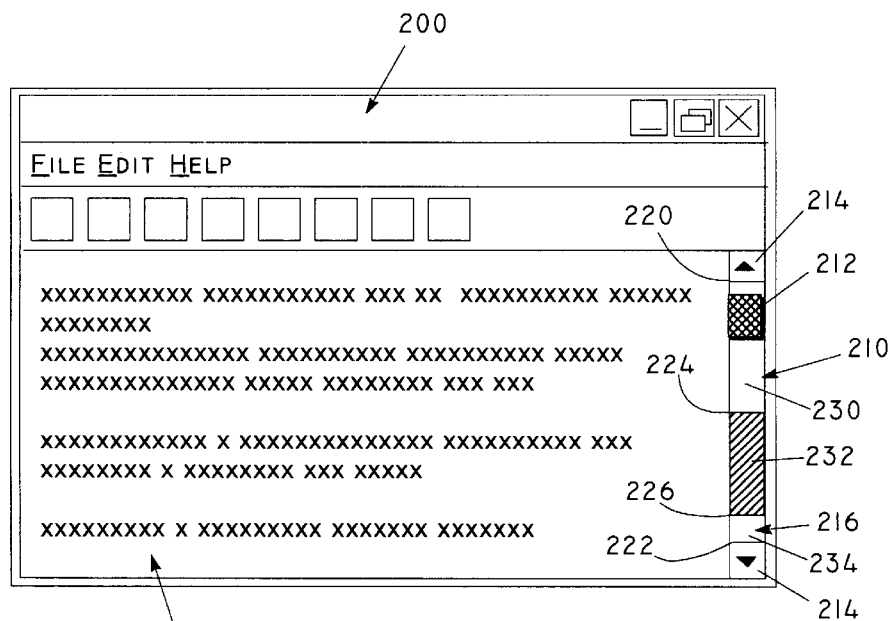
Fig. 11
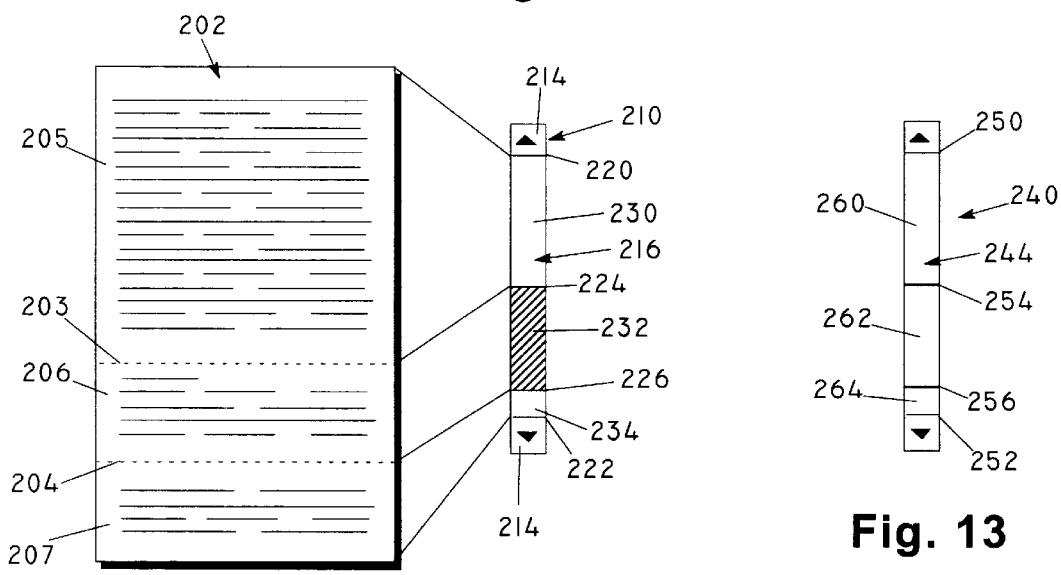
Fig. 12
Fig. 13

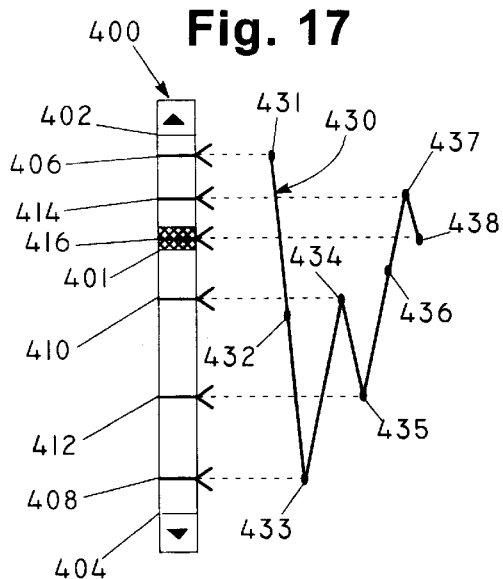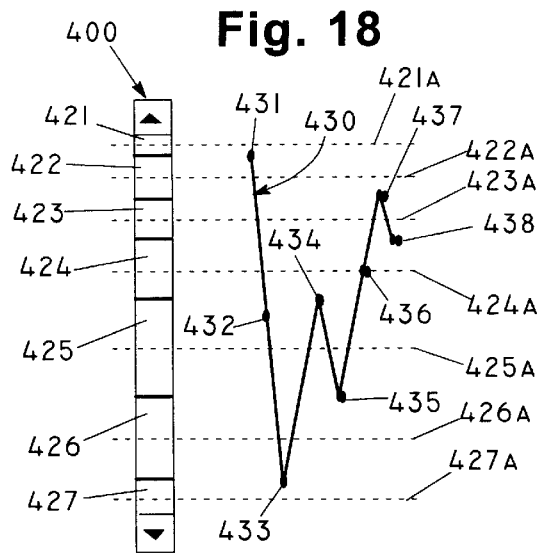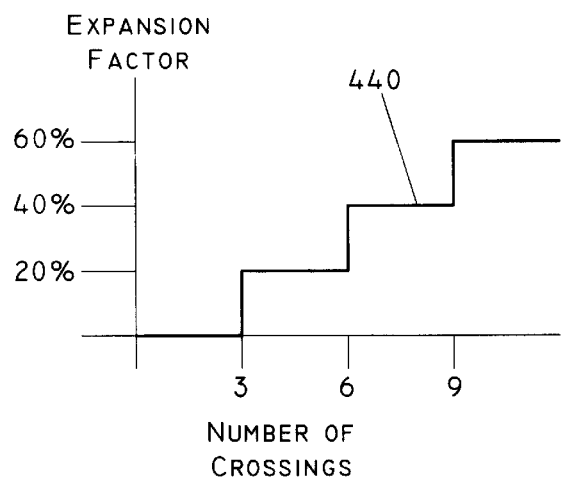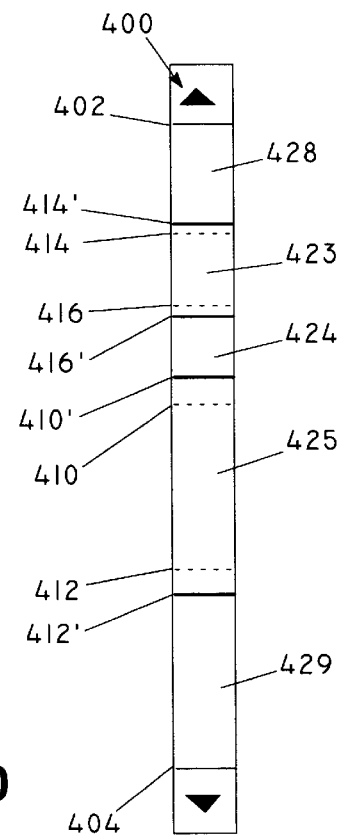
Fig. 17
Fig. 18
Fig. 19
Fig. 20

COMPUTER SYSTEM, USER INTERFACE COMPONENT AND METHOD UTILIZING NON-LINEAR SCROLL BAR

FIELD OF THE INVENTION

The invention is generally related to computers and computer software. More specifically, the invention is generally related to a manner of accessing information displayed on a computer display via a scroll bar.

BACKGROUND OF THE INVENTION

Many computer systems utilize graphical user interfaces (GUIs) to permit user interaction with data stored in such systems. In a GUT environment, users are typically able to interact with a computer system through intuitive operations such as "pointing and clicking" on graphical user interface components with a pointer controlled by a mouse or other user interface device. Data is often presented to a user in a GUI environment using a graphical user interface component known as a window. In many computer systems, data to be presented in a window is commonly referred to as a "document".

Similar to a physical window that typically offers a view of only a portion of a person's surroundings, a GUT window typically provides a view of only a portion of the data in a document. Consequently, whenever the amount of data in a document is too great for the entire document to be displayed in a window at the same time, many computer systems rely on graphical user interface components referred to as scroll bars to permit a user to access different portions of a document.

A scroll bar typically permits a user to scroll in a predetermined direction (i.e., vertically or horizontally) through manipulation of various controls on the scroll bar. For example, many scroll bars include an elongated track that represents the overall size of the document in the direction of the member. A slider is anchored on the track at the relative position of the portion of the document that is displayed in the window. The slider may be a fixed size, or may have a variable size along the length of the track to represent the relative size of the portion of the document displayed in the window. By depressing a mouse button while the pointer is disposed over the slider, and then moving the pointer along the length of the track while the mouse button is depressed, a user is typically permitted to scroll through the document (an operation known as "dragging" the slider).

A scroll bar may also include a pair of arrow buttons (also known as unit increment and decrement controls), disposed at each end of the track that permit line-by-line scrolling through the document in response to pointing and clicking on the buttons. Moreover, some scroll bars additionally permit a user to scroll screen-by-screen or page-by-page (known as a block increment or decrement) by pointing and clicking directly on the track between the slider and one of the arrow buttons.

One limitation of existing scroll bar designs is that the mapping between a scroll bar and a document is purely linear in nature. Specifically, movement of a slider along 10% of the track results in movement of the currently displayed position of the document 10%. Under this framework, it is often simpler to navigate in relatively smaller documents since movement of a slider a predetermined distance results in a comparatively smaller scroll through the document than would occur with a relatively larger document. Scrolling accuracy is therefore affected by the relative size of the document. In fact, it can become extremely difficult to scroll through very large documents with a slider since movement of the slider by even the smallest distance may result in a document scroll of several lines at a time.

Another difficulty with a linear mapping between a scroll bar and a document is that any two similarly-sized portions of a document are given exactly the same degree of emphasis on a scroll bar regardless of the relative importance of the content contained each portion. However, it has been found that different portions of many documents tend to be more important than others, typically by virtue of the relative importance of a portion's content, the relative frequency and/or amount that a portion is accessed, etc. Nonetheless, existing scroll bars treat the different portions in the same manner, often leading to inefficiencies in accessing a document.

SUMMARY OF THE INVENTION

The invention addresses these and other problems associated with the prior art in providing a computer system, user interface component and method in which a non-linear scroll bar is utilized to provide variable mappings between a scroll bar and different portions of a document. As a result, a scroll bar may be configured to vary the relative scroll rate of a portion of a document to either emphasize or de-emphasize that portion relative to other portions of the document. Generally, emphasized portions of a document may be allocated a relatively larger portion of a scroll bar (i.e., with a relatively lower scroll rate), such that navigation to and within such portions is facilitated relative to other portions of the document.

In another aspect, a scroll bar may be considered to be associated with a variable having associated therewith a range of values, with the range of values including various subranges. As a result, a scroll bar may be configured to vary the relative scroll rate of each subrange of values to either emphasize or de-emphasize that subrange relative to other subranges for the variable. For example, in the case of the display of a document in a window, the variable being selectively controlled may be a line or column number at which to display the document in the window, such that different subranges correspond to different regions of the document.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 4 is a flowchart illustrating the program flow of the main routine of the scroll bar object of FIG. 2.

FIG. 11 is a block diagram illustrating a document displayed in a window on the computer system of FIG. 1, showing one representation of non-linear scroll bar consistent with the invention.

FIG. 12 is a block diagram of the scroll bar in the window of FIG. 11, illustrating the mapping thereof to the document displayed in the window.

FIG. 13 is a block diagram of an alternate representation of a scroll bar to that illustrated in FIG. 11.

FIG. 17 is a block diagram of a scroll bar, illustrating the construction of a point list using the perform drag routine of FIG. 14.

FIG. 18 is a block diagram illustrating the establishment of boundaries for the scroll bar of FIG. 17 using the establish new boundaries routine of FIG. 16.

FIG. 19 is a graph of an expansion factor function utilized by the establish new boundaries routine of FIG. 16.

FIG. 20 is a block diagram of the scroll bar of FIG. 17 illustrating the combination and expansion of regions consistent with the invention.

DETAILED DESCRIPTION

Figure 1:
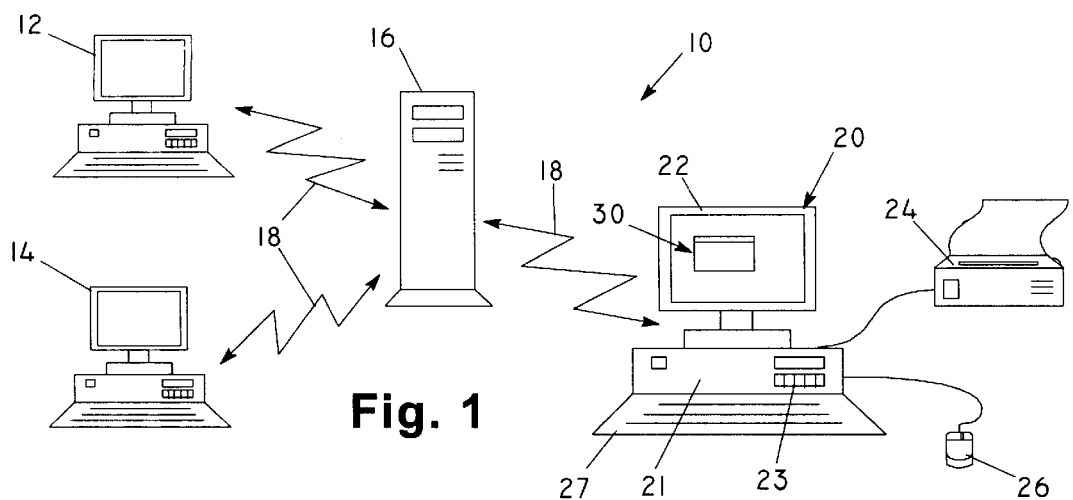
FIG. 1 is a block diagram of a computer system consistent with the invention.

The embodiments of the invention described hereinafter utilize a non-linear scroll bar to provide a scroll rate that varies for different portions of a document displayed in a window. The scroll bar is non-linear typically by virtue of a variable mapping between different portions of a scroll bar and the document that is accessed via the same. A document associated with a scroll bar can include any collection of information that is displayed in a window, whether stored in a specific file or record, or simply maintained as a collection of information for display in a window.

A scroll bar may more broadly be considered to be a user interface component that selects among any range of values, whether continuous or discrete. As a result, scrolling through a document in a window with a scroll bar is essentially an operation where the variable being selected is the current line or column at which to display the document in the window. Consequently, a non-linear scroll bar may also be considered to utilize a variable mapping between portions of a scroll bar and various subranges within the overall range of values that may be selected using the scroll bar.

A window may include conventional GUI window objects, as well as additional user interface objects capable of selecting among a range of information using a scroll bar or scroll bar-like object. For example, conventional GUI controls such as edit boxes, list boxes and combo boxes may be considered to include a window for displaying information, and thus may utilize a non-linear scroll bar consistent with the invention. Other information containers such as panels and frames that are typically embedded in objects such as conventional windows may also be considered to be windows. Moreover, additional GUI controls such as color wheels and the like, which in effect utilize sliders that are movable in two dimensions, may also utilize a non-linear scroll bar consistent with the invention.

Typically, regions of a scroll bar are explicitly or inherently associated with predetermined rates of scroll that determine the amount that a current position in a document is scrolled in response to a scroll operation with the scroll bar. Conversely, a rate of scroll may also be used to determine the amount that a slider on a scroll bar will move in response to scrolling the document by means other than the scroll bar (e.g., through keyboard input).

An explicit rate of scroll is provided when a rate of scroll value is stored with respect to a given region. An inherent rate of scroll is provided when one or more predetermined characteristics of a region are utilized to derive a rate of scroll for the region. For example, in one embodiment illustrated below, boundaries are defined that are mapped to specific locations in a document as well as to specific locations on a scroll bar. By defining regions between the boundaries, an effective rate of scroll for a region is generated using the document and scroll bar positions stored for the adjacent boundaries, typically by taking the ratio of the difference of the document positions to the difference of the scroll bar positions. Other manners of maintaining and/or calculating a rate of scroll may be used in the alternative.

Prior to discussing specific embodiments consistent with the invention, exemplary hardware and software embodiments will be provided hereinafter.

Hardware Environment

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operating system illustrated at 30, and executes various computer software applications, programs, objects, modules, etc. as is well known in the art. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
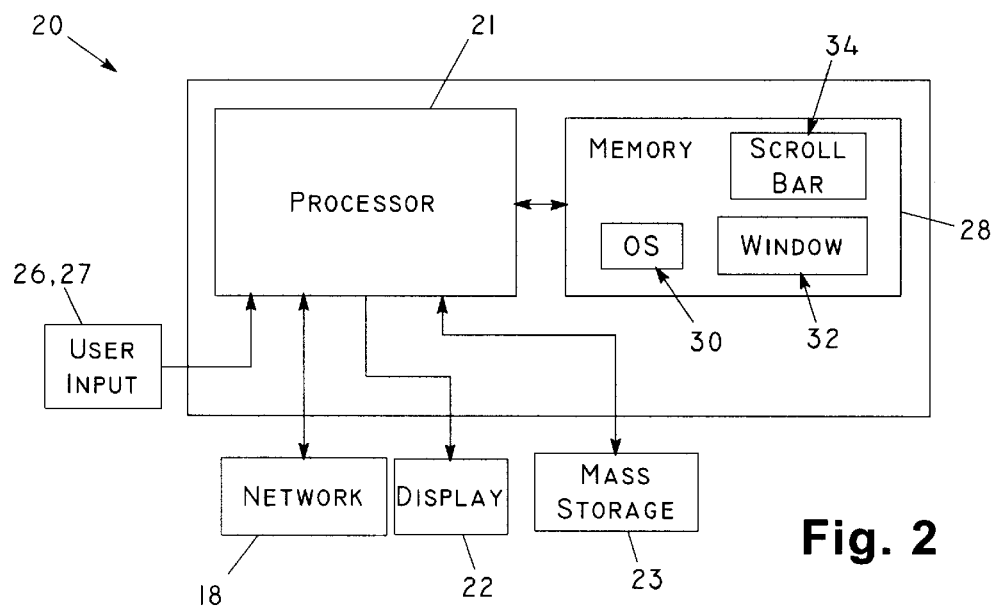
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

An operating system 30 is illustrated as resident in memory 28. However, it should be appreciated that various components of operating system 30 may be stored on network 18 or mass storage 23 prior to start-up, and in addition, various components may be resident at different times in any of memory 28, mass storage 23, network 18, or within registers and/or caches in processor 21.

Operating system 30 generally provides an event-driven graphical user interface (GUI) environment to provide data to and receive input from a user. Several GUI operating systems are known in the art and may be modified as described herein to implement a non-linear scroll bar consistent with the invention, e.g, the Windows family of operating systems from Microsoft, the Macintosh operating system from Apple, the OS/400 operating system from International Business Machines, as well as different variations of Unix, among others.

Within operating system 30 are defined several types of software objects that implement a GUI environment. Most relevant to the invention are window objects, illustrated at 32, and scroll bar objects illustrated at 34. It should be appreciated, however, that the principles of the invention may be applied directly to specific software applications, e.g., word processors, HTML browsers, etc. Moreover, the principles of the invention may also apply to non-object oriented environments consistent with the invention.

It should be appreciated that other software environments may be utilized in the alternative.

Non-Linear Scroll Bar

Figure 3:
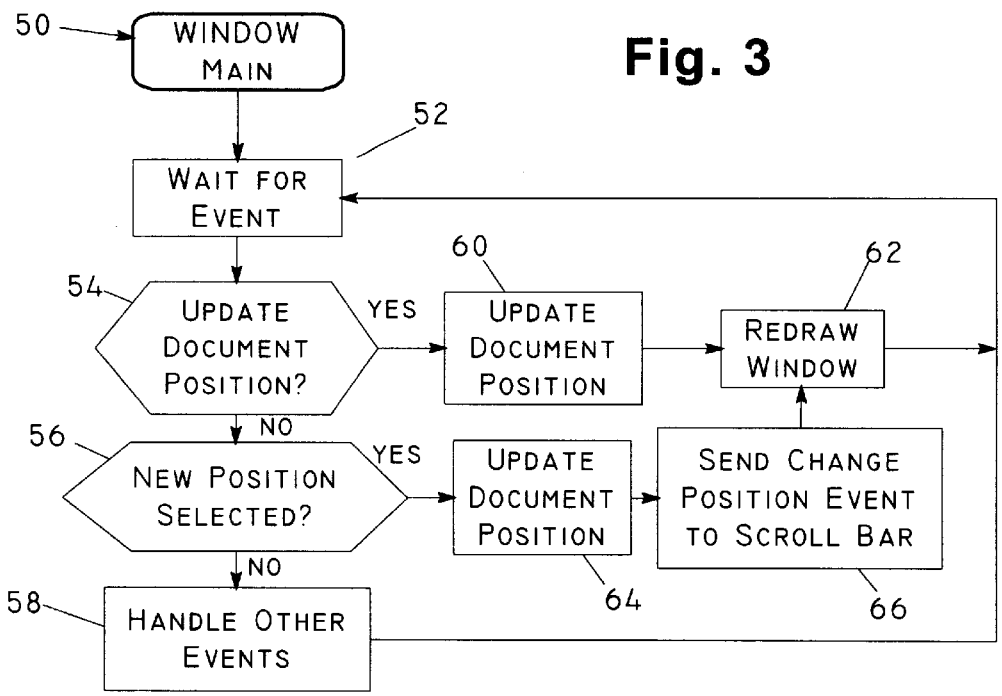
FIG. 3 is a flowchart illustrating the program flow for the main routine of the window object of FIG. 2.

FIG. 3 illustrates an exemplary program flow for a main routine 50 executed by window object 32 of FIG. 2. Routine 50 is shown implemented in an event-driven representation. However, other programming models, e.g., procedural, may be used in the alternative.

The discussion hereinafter focuses on the interaction of a window object 32 and associated scroll bar object 34. The window object controls the display of a document at different positions, and the amount of a document that is displayed in a window is typically based upon the size of the window. The scroll bar object is associated with a window to control the portion of the document that is displayed in the window. The window, however, may also be required to control the portion of the document displayed in the window, e.g., as a result of keyboard input. For illustrative purposes, a window will be assumed to store a current document position parameter, and the scroll bar will be considered to store a current scroll bar position parameter. The document and scroll bar positions, however, must be coordinated, and thus, it is anticipated that both the window and the scroll bar will be required from time to time to update one another to maintain coordination therebetween.

It should further be noted that the discussion hereinafter will utilize the example of a vertically-oriented scroll bar for scrolling vertically through a document. As the principles of the invention apply equally to horizontal scroll bars, among other potential orientations, the invention should not be limited to the vertically-oriented scroll bars disclosed herein.

Routine 50 generally operates in an endless loop that waits for events at block 52, checks for certain specified events, processes those events, and returns to block 52 to wait for additional events.

A number of events generally related to the use of a non-linear scroll bar consistent with the invention are illustrated at blocks 54 and 56. Additional events conventionally handled by a window object, but which are not relevant to an understanding of the invention, are handled in a conventional manner in block 58.

For example, block 54 detects an update document position event that typically includes a new position in the document to display as the current position in the window. Typically, the current document position is the top left corner of the window, and may be identified by various parameters such as a line and column number, or x, y coordinates, among others. As will be discussed in greater detail below, the update document position event may be initiated, for example, by the scroll bar object associated with the window. In response to detection of the event, control is passed to block 60 to update the document position in a manner well known in the art. Next, block 62 is executed to redraw the window, also in a manner well known in the art. Handling of the event is then complete.

Another event that may be handled by routine 50 is that of the selection of a new position in the document, as detected at block 56. This event is generated, for example, in response to non-scroll bar related updates to the position of the document in the window. For example, the new position selected event may be initiated in response to a user typing additional text into a document such that the window scrolls down to incorporate the new text. The new position selected event may also be initiated, for example, in response to keyboard actuation such as up or down arrow keys or page up or page down keys, among others. Other user input, e.g., via menus, dialog boxes, etc., may also generate a new position selected event consistent with the invention.

If a new position selected event is detected in block 56, control is passed to block 64 to update the document position in the same manner described above for block 60. Next, a change position event is sent to the scroll bar object associated with the window in block 66. As described in greater detail below, the change position event updates the position of the slider on the scroll bar to reflect the new position of the document and thereby coordinate the scroll bar with the window. Upon completion of block 66, control is passed to block 62 to redraw the window in a manner well known in the art. Handling of the event is then complete.

FIG. 4 illustrates an exemplary program flow for a main routine 70 executed by scroll bar object 34 of FIG. 2. Like routine 50, routine 70 is shown implemented in an event-driven representation, where an endless loop is executed with block 72 waiting for events passed to the scroll bar. Various events related to the non-linear scroll bar consistent with the invention are detected at block 74–82, and other events handled by the scroll bar, but which are not relevant to an understanding of the invention, are handled in a conventional manner in block 84.

One event handled by routine 70 is a drag slider event, detected at block 74. In response to such an event, a perform drag routine 100 is executed to handle the drag event. Typically, a drag slider event is initiated in response to a user clicking on a scroll bar slider and moving a mouse pointer along the length of the scroll bar track while depressing the mouse button. With a drag slider event, the document is typically scrolled directly in response to movement of the mouse pointer. In the alternative, updating of the document position may be deferred until the mouse button is released to reduced the overhead associated with repeatedly updating the contents of the window. In either event, upon the completion of routine 100, the slider is positioned at a specific position selected by a user, with the document scrolled to the position corresponding to that selected position on the scroll bar.

Another event handled by routine 70 is that of a change position event, which is detected at block 76 and handled by an update slider position routine 120. As discussed above, the change position event is generated by the window associated with the scroll bar, specifically, by block 66 of routine 50 (FIG. 3). As is discussed above, the slider position is typically updated after a new position in the document has been selected by means other than the scroll bar.

Another event handled by routine 70 is a down line event, which is detected at block 77 and handled by a scroll line down routine 140. The down line routine is typically utilized in scroll bar implementation having a down arrow button functioning as a unit increment control. As will be discussed in greater detail below, similar events such as up line events (unit decrement events), as well as up or down page events or up or down screen events (block decrement or increment events), may also be generated and handled in a substantially similar manner to the down line event.

Another event handled by routine 70 is that to add a boundary, which is detected at block 78 and handled by block 86.

Figure 5:
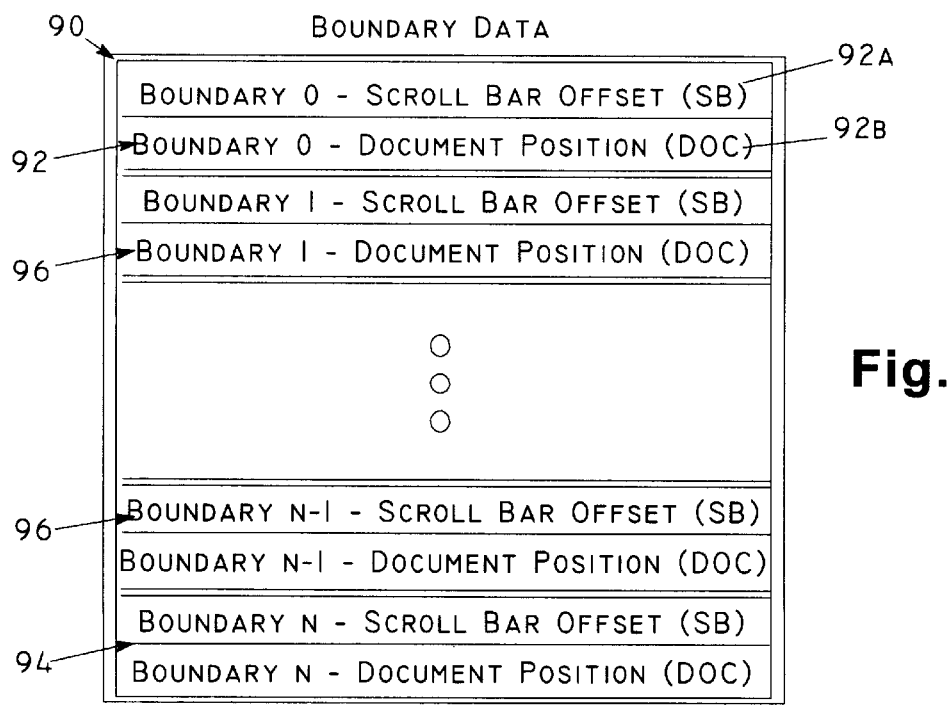
FIG. 5 is a block diagram of a scroll bar boundary data structure consistent with the invention.

Generally, the regions of a non-linear scroll bar may be defined by a plurality of boundaries. Each boundary has associated therewith both a position on the scroll bar and a position in the document. Any number of data structures may be utilized to maintain a list of boundaries consistent with the invention. For example, as shown in FIG. 5, a boundary data structure 90 may include a plurality of boundaries stored in a data structure such as a linked list. Data structure 90 may include, for example, start and end (or top and bottom) boundaries 92, 94, which respectively point to the beginning and end of the document/scroll bar. A plurality of intermediate boundaries 96 may then be linked between the start and end boundaries 92, 94 to delineate the regions of the scroll bar.

As illustrated by start boundary 92, each boundary may include a scroll bar position 92*a* and document position 92*b* associated therewith. The scroll bar position may be specified as an offset from the first position on the scroll bar. Typically, the scroll bar position is stored as a relative value, rather than a specific location, as it is customary for a scroll bar to be resized in conjunction with the resizing of a window with which it is associated. Accordingly, the scroll bar offset may be stored, for example, as a percentage value related to the relative position of the scroll bar position on the scroll bar.

The document position may also be stored as a offset or relative value, but is typically associated with a specific location in the document along the direction that a document is scrolled by the scroll bar. For example, for a vertical scroll bar, the document position may be stored as a y coordinate or as a line number in the document. Similarly, for a horizontal scroll bar, the document position may be stored as an x coordinate or as a column number in the document. Other manners of specifying specific locations in a scroll bar and/or document may be used in the alternative.

Returning to FIG. 4, the add boundary event detected in block 78 is typically handled in block 86 by adding a new boundary to the boundary data structure using the document position and scroll bar position that is specified in the event. With a linked list implementation of a boundary data structure, for example, the addition of a boundary typically includes a process of scanning through the linked list to find immediately preceding and succeeding boundaries in the linked list, and then replacing the pointer from the preceding to the succeeding boundary with a pointer to the new boundary. Similarly, the pointer for the new boundary is set to point to the succeeding boundary. With other data structure implementations, alternate manners of adding a boundary may be used in the alternative.

After a boundary has been added, block 86 passes control to a redraw scroll bar routine 160 that refreshes the display of the scroll bar to reflect the new boundary. Handling of the add boundary event is then completed.

Another event handled by main routine 70 is that of redrawing the scroll bar, which is detected at block 80 and handled by the aforementioned redraw scroll bar routine 160.

Another event handled by routine 70 is that of removing a boundary, which is detected at block 82 and handled at block 88 by removing a boundary from the boundary data structure if the document position and/or scroll bar position for the boundary identified in the event exists. Typically, the removal of a boundary from the boundary data structure operates in converse manner to the addition of a boundary. For example, with a linked list implementation, a boundary is removed by updating the pointer on the immediately preceding boundary to point to the immediate succeeding boundary of the boundary to be removed, thereby eliminating the boundary from the linked list structure.

After a boundary is removed in block 88, control again passes to block 160 to redraw the scroll bar to reflect the elimination of the boundary on the scroll bar.

The addition and removal of boundaries to and from a scroll bar may be performed in a number of manners consistent with the invention. For example, a user may add and/or remove boundaries manually, e.g., via drag operations, menu selections, tool bar button selections, control key sequences, or in other manners known in the art for receiving user input. A user may perform a specific user input while pointing at a specific location on a scroll bar or a document, with the system then prompting the user for a corresponding matching document position or scroll bar position to that initially selected by the user. As one example, a user may be permitted to right click (depress the right mouse button) at a specific location on a scroll bar and select an "add new boundary" selection from a pop-up menu. The system may then prompt the user to point and click on a specific location in the document to obtain a document position. In the alternative, the current position of the document (i.e. the top left corner) that is displayed in the window may be used as the document position. Any of a number of alternate manners of selecting a combination of a document position and a scroll bar position for the establishment of a boundary may be used in the alternative. Similarly, removal of a boundary may be performed, for example, by right clicking on a boundary displayed on a scroll bar and selecting a "delete boundary" option on a pop-up menu. In the alternative, a boundary may be dragged off or on a scroll bar to delete or add the boundary to the scroll bar, e.g., through a drag and drop control sequence. Other manners of creating, selecting and/or deleting an object may be used consistent with the invention.

The addition or initial placement of boundaries on a scroll bar may also be set by the creator of an application or of a particular document. For example, it may be desirable for an application to automatically emphasize particular regions of a document, e.g. to highlight types of information that are typically accessed more frequently. As another example, the creator of a document may desire to emphasize certain regions of a document that the creator anticipates will be accessed more frequently, or that a creator wishes to draw a reader's attention based upon content. To this extent, it may be desirable to store scroll bar mapping parameters with a document file, e.g., through tags or header information, so that the preferred scroll bar for a document can be restored.

Boundaries may also be determined automatically and/or dynamically by a computer system based upon predetermined factors, e.g., the navigation history of a user's browsing of a document over time. Alternate implementations which dynamically allocate boundaries based upon navigation history are described in greater detail below in connection with FIGS. 14–23.

Other manners of creating and allocating regions of a scroll bar will be apparent to one of skill in the art.

Figure 6:
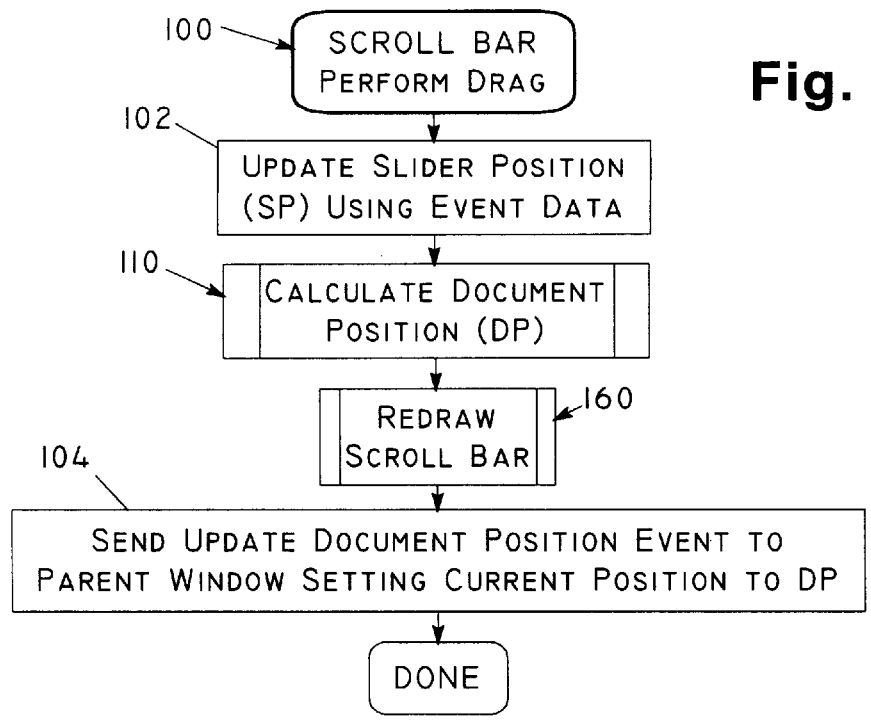
FIG. 6 is a flowchart illustrating the program flow of the perform drag routine of FIG. 4.

Perform drag routine 100 is illustrated in greater detail in FIG. 6. Routine 100 begins at block 102 by updating the slider position (SP) using the position data provided in the event that initiated the routine. As discussed above, the drag slider event may be initiated after any movement of the slider by the user. In the alternative, the drag slider event may be initiated only after a user has moved the slider and released the appropriate mouse button. In either event, the event data should include a relative position on the scroll bar at which to display the slider.

Once the slider position for the scroll bar has been updated, a calculate document position routine 110 is called to determine the current document position associated with the current position of the slider on the scroll bar. Next, the scroll bar is refreshed by calling redraw scroll bar routine 160. Next, based upon the document position calculated in routine 110, block 104 is executed to send an update document position event to the parent window requesting that the current position of the document displayed in the window be set to the value calculated in routine 110. Routine 100 is then terminated, and handling of the drag slider event is complete.

Figure 7:
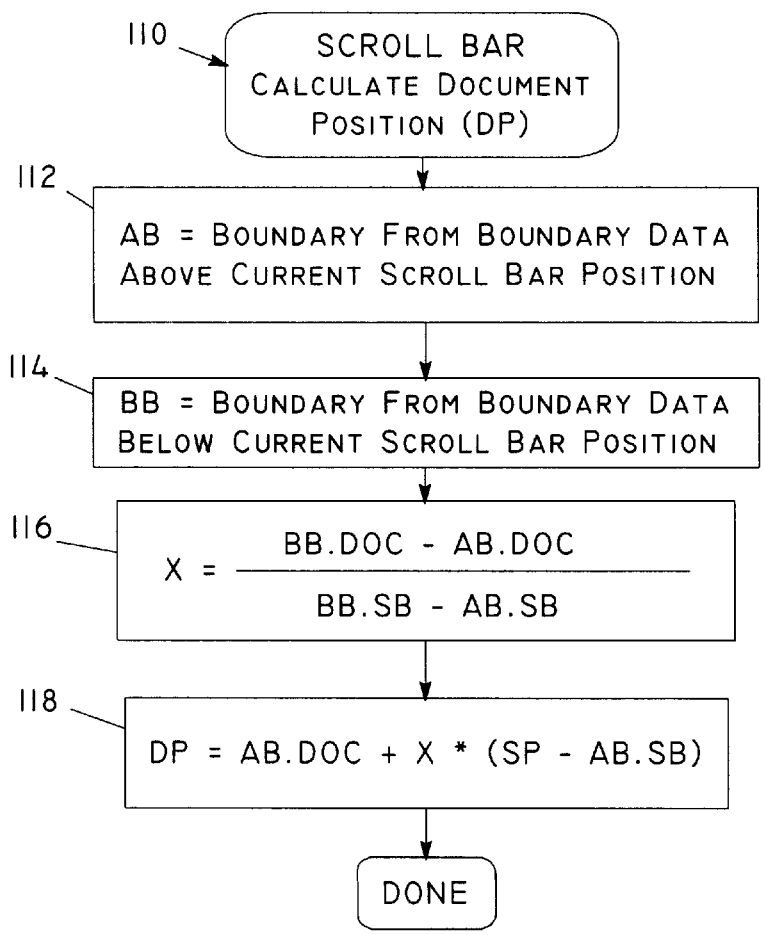
FIG. 7 is a flowchart illustrating the program flow of the calculate document position routine of FIG. 6.

The calculate document position routine 110 is illustrated in greater detail in FIG. 7. Routine 110 performs a number of mathematical calculations in blocks 112–118 to determine a document position that corresponds to the current slider position. First, in blocks 112 and 114, the immediately preceding and succeeding boundaries relative to the current scroll bar position are located in the boundary data structure. Typically, an immediately preceding boundary is determined to be the nearest boundary with a scroll bar position that is less than or equal to the current slider position, with the immediately succeeding boundary being the nearest boundary with a scroll bar position that is greater than the current slider position. In the alternative, a boundary having a scroll bar position that equals the current slider position may be considered a succeeding boundary. In addition, it may be possible in some applications for multiple boundaries to have the same scroll bar position. In such circumstances, a nearest boundary may be determined using the document position therefor as a tiebreaker.

Next, in block 116, a rate of scroll for the region defined between the boundaries is calculated by taking the ratio of the difference between the document positions stored for the immediately preceding and succeeding boundaries to the difference of the scroll bar positions specified for the same boundaries. Specifically, if AB is the immediately preceding boundary and BB is the immediately succeeding boundary, the rate of scroll for the region defined therebetween is calculated as follows:

$$X = \frac{BB.DOC - AB.DOC}{BB.SB - AB.SB}$$

Where X is the rate of scroll, BB.DOC is the document position stored for the succeeding boundary, AB.DOC is the document position for the immediately preceding boundary, BB.SB is the scroll bar position stored for the immediately succeeding boundary and AB.SB is the scroll bar position stored for the immediately preceding boundary.

Next, in block 118, the document position is calculated by calculating an offset from the document position for the immediately preceding boundary. The offset is calculated as the rate of scroll multiplied by the difference between the current scroll bar position and the scroll bar position stored for the immediately preceding boundary. Specifically:

$$DP = AB.DOC + X*(SP - AB.SB)$$

where DP is the document position and SP is the scroll bar position.

Upon completion of block 118, the document position has been calculated, and routine 110 is then complete.

Figure 8:
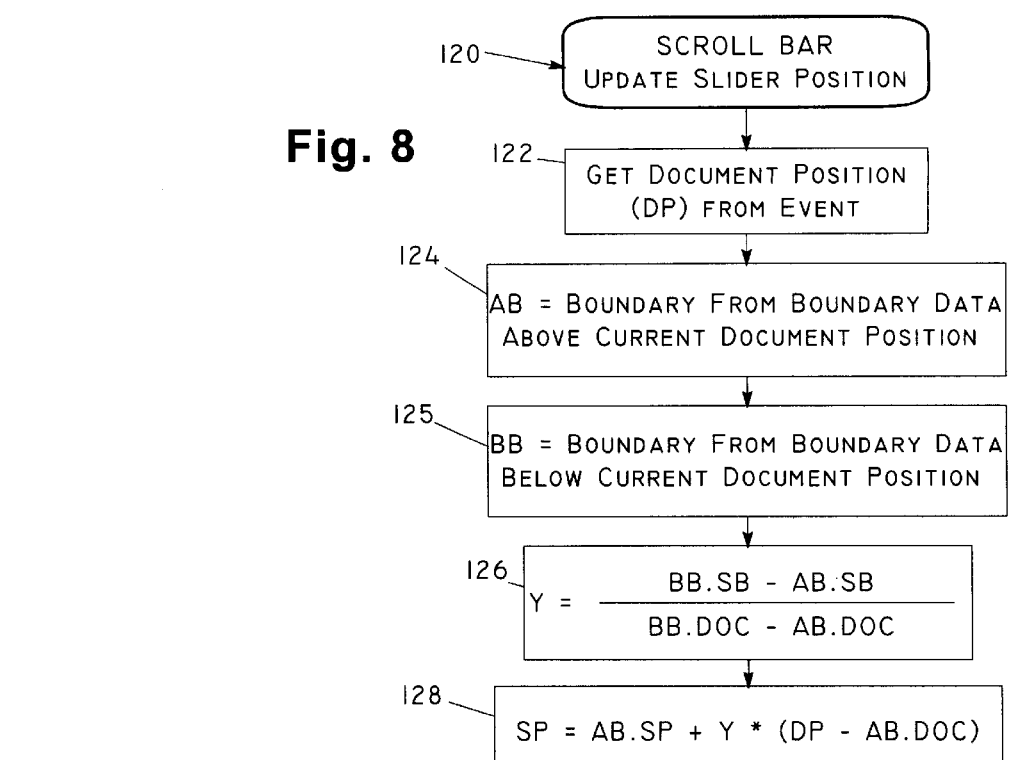
FIG. 8 is a flowchart illustrating the program flow of the update slider position routine of FIG. 4.

Update slider position routine 120 is illustrated in greater detail in FIG. 8. As discussed above, update slider position routine 120 is called in response to a change position event that is typically generated by a non-scroll bar update of the document position. Essentially, routine 120 calculates a scroll bar position from a known document position in the converse manner to the calculation of a document position from a known scroll bar position in routine 110 (FIG. 7).

Accordingly, routine 120 begins in block 122 by retrieving the document position from the event data. Next, in blocks 124 and 125, the immediately preceding and succeeding boundaries relative to the current document position are located in the boundary data structure. Next, in block 126, a scaling factor Y, that is essentially the inverse of the rate of scroll calculated at block 116 of routine 110, is calculated. Specifically, a scaling factor Y is calculated as:

$$Y = \frac{BB.SB - AB.SB}{BB.DOC - AB.DOC}$$

Next, the scroll bar position is calculated from the document position by adding an offset value to the scroll bar position associated with the immediately preceding boundary. The offset is calculated as the scaling factor multiplied by the difference between the current document position and the document position stored for the immediately preceding boundary. Specifically, the scroll bar position SP is calculated in the following manner:

$$SP = AB.SB + Y^*(DP - AB.DOC)$$

Upon completion of block 128, the scroll bar position has been calculated. Next, redraw scroll bar routine 160 is called to refresh the scroll bar, and routine 120 then terminates.

Figure 9:
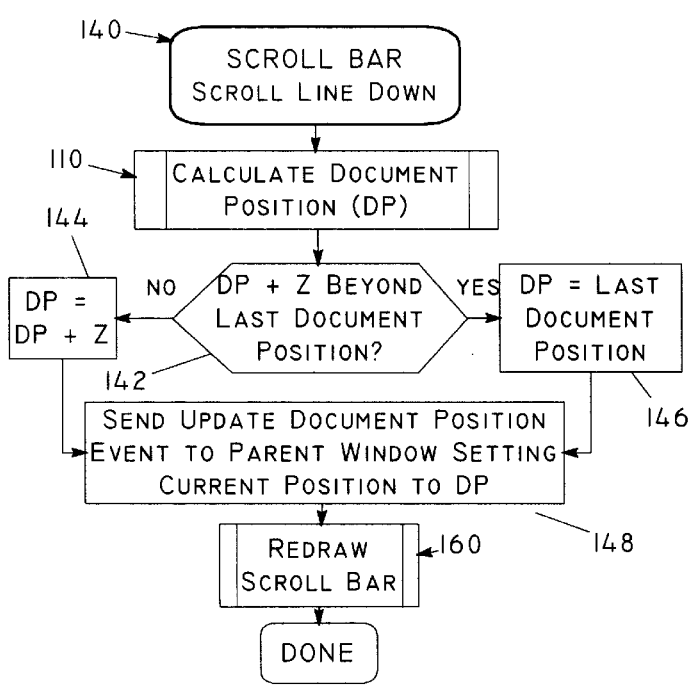
FIG. 9 is a flowchart illustrating the program flow of the scroll line down routine of FIG. 4.

Scroll line down routine 140 is illustrated in greater detail in FIG. 9. As discussed above, routine 140 is typically initiated in response to user selection of the down arrow button associated with the scroll bar, reflecting a user desire to scroll down a single line in the document.

Routine 140 begins by calling calculate document position routine 110 to retrieve the current document position for the current position of the scroll bar slider. Next, block 142 determines whether the document position plus a predetermined unit increment is beyond the last document position available for the document. Specifically, it is determined whether it is possible to scroll down a line from the current location displayed in the window. Typically, the predetermined unit increment is one if the position is related to a line number. On the other hand, the predetermined unit increment may reflect a predetermined number of pixels if x, y coordinates are utilized to determine the document position. Moreover, it should be appreciated that the last document position is typically not the end of the document, as the current position of the document is typically the top left corner that is displayed in the window. Accordingly, there will be an offset from the bottom of the document based upon the amount of the document that must be displayed in the window below the current document position.

If the scroll down event will not increment the document position beyond the last document position, block 144 is executed to add the predetermined unit increment to the document position. If, on the other hand, the addition of the predetermined unit increment to the document position would scroll beyond the last document position, the document position is set to the last document position for the document. In either event, control passes to block 148 to send an update document position event to the parent window, thereby setting the current position to the new document setting. Next, routine 160 is called to redraw the scroll bar and thereby update the position of the slider to reflect the new document position. Routine 140 is then complete.

It should be appreciated that similar routines to routine 140 may be required for additional events handled by the scroll bar. For example, for a scroll line up event, which is typically generated via depression of an up arrow button on the scroll bar, a similar routine would be utilized to subtract a predetermined increment from the document position so long as the first document position has not been exceeded thereby. In addition, it should be appreciated that events may be generated for page-by-page scrolling and/or screen-by-screen scrolling (also known as block increments and decrements), e.g., in response to a user pointing and clicking on the scroll bar track between the slider and an end of the scroll bar. In such situations, the predetermined increment to added or subtracted from the current document position is a block increment that reflects a scroll for a full page or screen of information. Otherwise, the overall program flow thereof typically follows that of routine 140.

Figure 10:
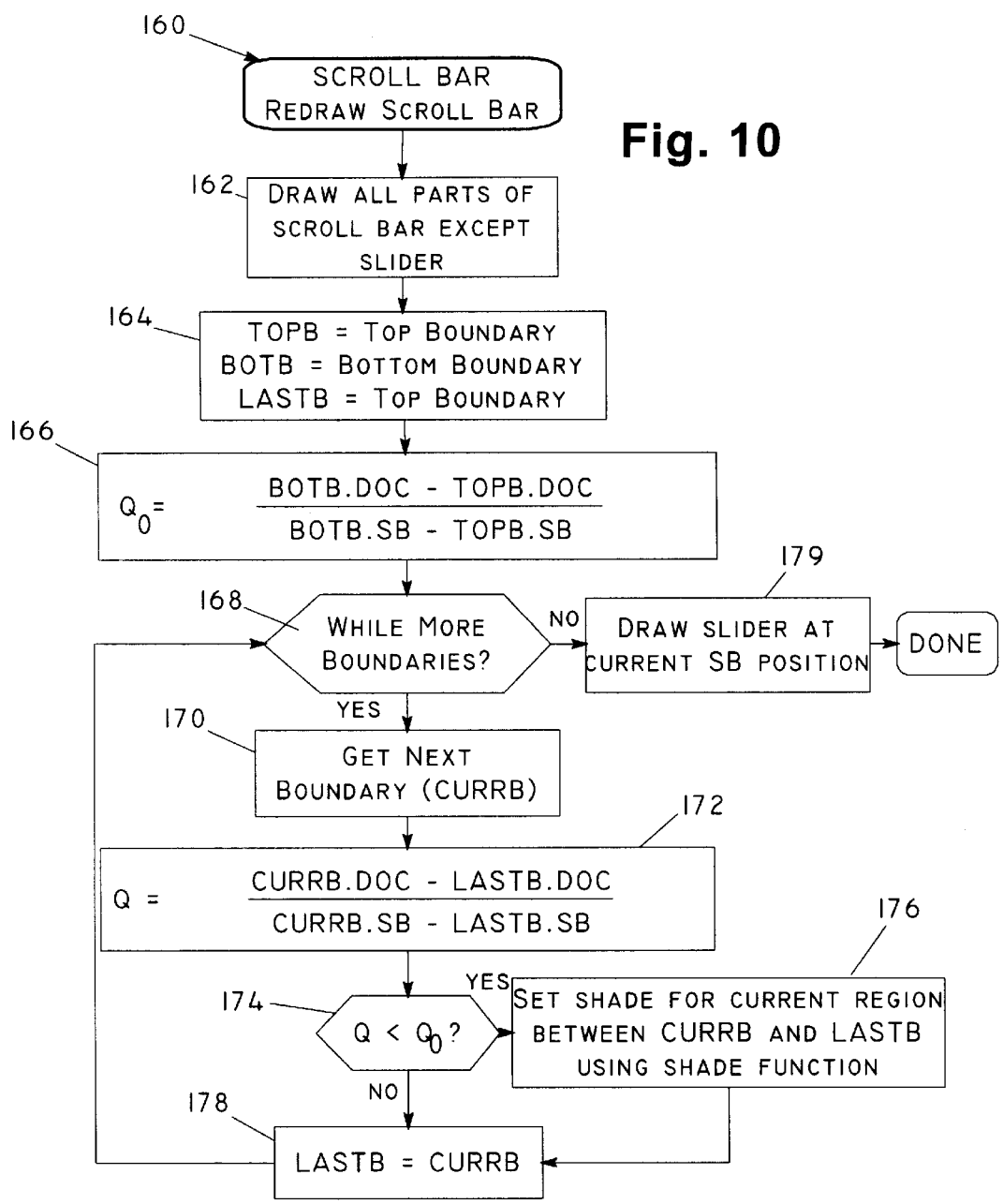
FIG. 10 is a flowchart illustrating the program flow of the redraw scroll bar routine of FIG. 4.

FIG. 10 illustrates redraw scroll bar routine 160 in greater detail. Routine 160 generally operates to display the scroll bar with visually distinct representations for each of the regions therein based upon the relative rates of scroll therefor. For example, the different regions of the scroll bar may be distinguished based upon unique shadings. However, as discussed in greater detail below, other manners of distinguishing the scroll bar regions, such as using different colors or patterns, or by delineating each region using a boundary display element, may be used in the alternative.

Routine 160 begins in block 162 by rendering all parts of the scroll bar except for the slider, in a manner that is generally well understood in the art. Next, in block 164, several variables are initialized. First, a TOPB variable is set to the top boundary or the first boundary in the boundary data structure. A BOTB variable is set to the bottom boundary, or the end boundary in the boundary data structure. In addition, a LASTB variable is also set to the top boundary in the boundary data structure.

Next, in block 166, an overall rate of scroll for the scroll bar, designated $Q_0$ is calculated by taking the ratio of the difference between the document positions of the bottom and top boundaries to the difference of the scroll bar positions of the bottom and top boundaries. Calculation of the overall rate of scroll for the scroll bar determines a base line to which the relative rates of scroll for different regions of the scroll bar may be compared.

Next, block 168 initiates a while loop that processes each boundary in the boundary data structure with the exception of the top boundary. Therefore, in block 170, the next current boundary, designated CURRB, is retrieved from the boundary data structure. Initially, the first boundary to be retrieved in this manner is the first boundary immediately succeeding the top boundary in the boundary data structure.

Next, a rate of scroll (Q) for the region defined by the current boundary and the last boundary is calculated by taking the ratio of the difference of the document positions for the current and last boundaries to the difference of the scroll bar positions for the current and last boundaries. Next, in block 174, the region rate of scroll is compared to the overall rate of scroll $Q_0$. If the rate of scroll for the region is less than that of the overall scroll bar, control is passed to block 176 to set a shade for the current region using a predetermined shade function. For example, the shade function may be a variable function such as a step function that sets the shade level for the region based upon its rate of scroll. After the shade has been set for the current region, control is passed to block 178 to set the last boundary (LASTB) to equal the current boundary (CURRB). Control is then returned to block 168 to process additional boundaries in the boundary data structure.

Returning to block 174, if the rate of scroll for the region is not less than that of the overall scroll bar, block 176 is skipped, and control passes directly to block 178.

After all boundaries in the boundary data structure have been processed, block 168 passes control to block 179 to draw the slider at the current scroll bar position in a manner well known in the art, typically with the slider centered at the current scroll bar position and having either a fixed size or a size that varies with the relative size of the displayed contents in the window relative to the document as a whole. Routine 160 is then terminated, and the redraw of the scroll bar is complete.

It should be appreciated that a number of modifications may be made to the redraw scroll bar routine consistent with the invention. For example, block 174 may be omitted such that different shades are used for different regions irrespective of whether the regions are expanded relative to other regions in the scroll bar. In addition, as discussed above, rather than setting the shade for each region, other parameters, such as colors, patterns, icons or alphanumeric information may be set for each region. Moreover, separate boundary display elements may be displayed to delineate each region. Other variations will be apparent to one of ordinary skill in the art.

One suitable visual representation of a non-linear scroll bar consistent with the invention is illustrated in FIG. 11. Specifically, a scroll bar 210 is illustrated as associated with a document 202 displayed in a window 200. Scroll bar 210 includes a slider 212, a pair of arrow buttons 214, which function as unit increment/decrement controls, and a track 216 functioning as a block increment/decrement area. As is well known in the art, user selection of a unit increment/decrement control such as an arrow button scrolls the associated document up or down a unit increment, typically a single line for a vertically oriented scroll bar. A block increment/decrement operation (typically a screen-by-screen or page-by-page scroll) is typically initiated in response to user selection of the track between the slider and one of the ends of the scroll bar.

Consistent with the invention, scroll bar 210 has been provided with a plurality of boundaries 220, 222, 224 and 226 that function to divide the scroll bar into three regions 230, 232 and 234. As shown in FIG. 12, for example, the mapping of scroll bar 210 to document 202 typically includes mapping each region of the scroll bar to a region in the document. For example, boundaries 220 and 222 of scroll bar 210 respectively represent the start and end positions of both the scroll bar and the document. The additional boundaries 224, 226 have associated therewith the scroll bar positions illustrated in FIG. 12, as well as the document positions 203, 204 represented in document 202. As such, region 230 on scroll bar 210 corresponds to region 205 in document 202. Similarly, regions 232 and 234 of scroll bar 210 correspond to regions 206 and 207 of document 202, respectively.

As is further illustrated in FIG. 12, the different regions 230–234 of scroll bar 210 may be visually distinguished in any number of manners. For example, different shading, coloring, or patterning may be used to distinguish the various regions on the scroll bar. As such, region 232, which is expanded relative to regions 230 and 234, is illustrated with a distinct visual representation from the other regions. It may also be possible to utilize icons and/or alphanumeric information to distinguish or label each region. Morever, statistical information, e.g., the rates of scroll, may be displayed for each region.

FIG. 13 illustrates an alternate representation of the scroll bar 240 which includes boundaries 250, 252, 254 and 256 that define regions 260, 262 and 264. In this representation, boundaries 254 and 256 are rendered on the scroll bar to visually distinguish regions 260, 262 and 264.

Any number of alternate manners may be utilized to visually distinguish each region of a scroll bar. Moreover, various regions may be distinguished by rendering each region in a unique representation. Alternatively, only a subset of the regions may be visually distinguished, with other regions displayed in non-distinct representations.

For example, as illustrated by redraw scroll bar routine 160 of FIG. 10, it may be desirable to shade a region of a scroll bar with a relative shading based upon the rate of scroll defined for that region. Between the maximum and minimum compaction represented by a scroll bar there may be a virtually infinite number of variations of shading on the scroll bar.

Various additional modifications may be made to the utilization, configuration and display of a non-linear scroll bar consistent with the invention.

Figure 14:
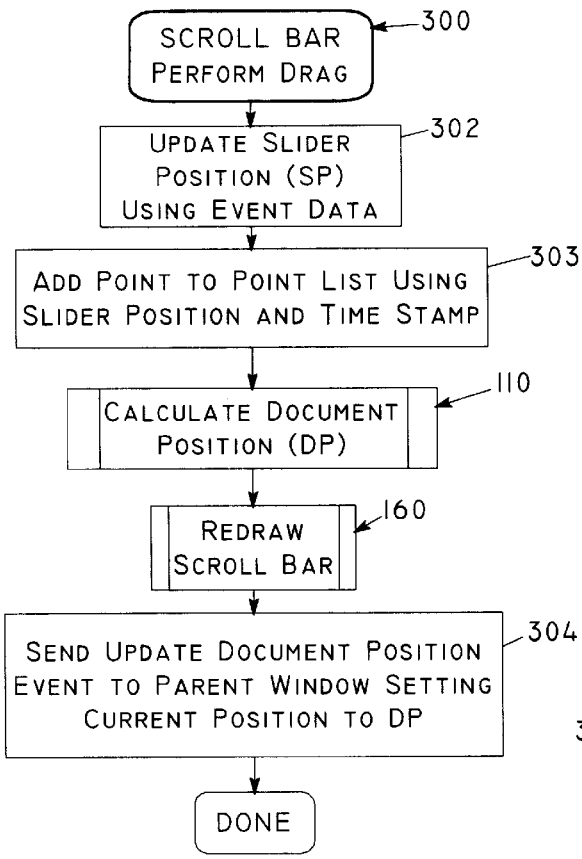
FIG. 14 is a flowchart illustrating the program flow of an alternate perform drag routine to that shown in FIG. 6.
Figure 15:
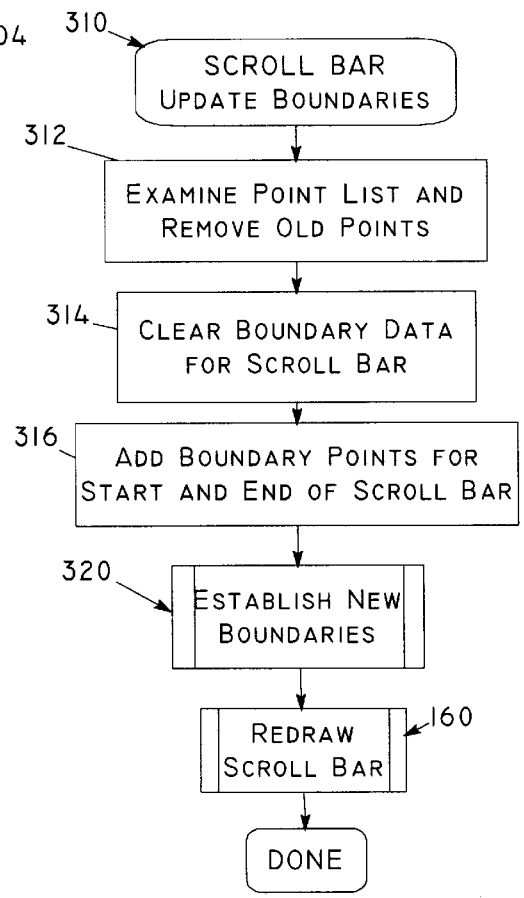
FIG. 15 is a flowchart illustrating the program flow of an update boundaries routine executed by the scroll bar object of FIG. 2.
Figure 16:
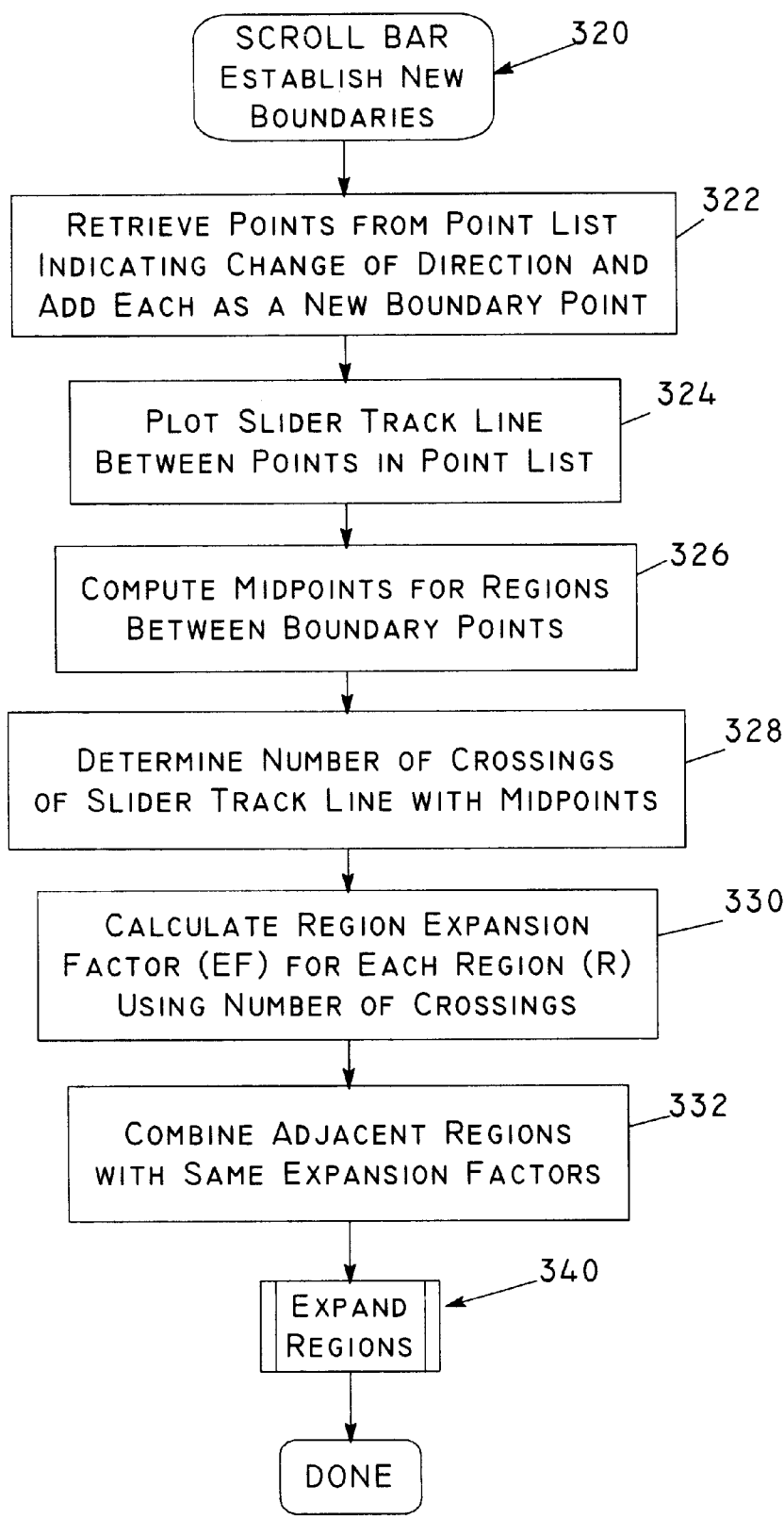
FIG. 16 is a flowchart illustrating the program flow of the establish new boundaries routine of FIG. 15.

For example, as illustrated in FIGS. 14–16, a scroll bar may be provided with a manner of dynamically adjusting the regions of the scroll bar based upon different factors. For example, a navigation history of a user may be maintained to adjust the relative rates of scroll for different regions based upon the amount of use of each region of the document.

To implement the dynamic updates, a mechanism must be provided to track the position of the scroll bar over time. In addition, a mechanism must be provided to periodically update the boundaries based upon the accumulated data.

In one implementation, each of the scroll bar updating routines, such as the drag event handlers, the position update handlers, and the handlers for the unit and block decrement/increment operations, may be modified to create a record of the navigation of the user in response to the operations. In the alternative, the navigation history could be maintained by storing the position of the slider at predetermined time increments, e.g., in a background thread. It may also be desirable to accumulate or time the amount of time the scroll bar is located at a particular position so that a region in which the slider is disposed expands over time.

Like maintaining a navigation history, the dynamic recalculation of boundaries may be performed in response to predetermined user actions. More preferably, however, dynamic recalculation is performed periodically in a background thread.

FIG. 14 illustrates, for example, an alternate perform drag routine 300 in which blocks 302, 110, 160 and 304 operate in the same manner as blocks 102, 110, 160 and 104 of routine 100 of FIG. 6. Routine 300 adds the additional step in block 303 of adding a point to a point list. The point list generally represents a collection of slider positions at various points in time based upon the user's navigation through the document. Any number of data structures may be utilized to maintain a point list, with each point having associated therewith a position on the slider, as well as an optional time stamp that may be used to identify the relative timing of the positioning of the slider. In the alternative, a point list may eliminate the use of a time stamp, instead chaining together points into a sequential data structure that permits older points to be discarded, e.g., using a circular stack data structure. It should be appreciated that a similar manner of recording points may be used to modify other scroll bar routines that handle navigational operations with the scroll bar.

FIG. 15 illustrates an update boundaries routine 310 that is typically executed as a separate thread for the scroll bar and is a background process that is performed on a periodic basis. Routine 310 begins in block 312 by examining the existing point list and removing old points, typically by using the time stamp of each point, or in the alternative, by discarding the oldest points if the number of points exceeds a predetermined maximum size.

Next, in block 314, the boundary data for the scroll bar is cleared, and in block 316, boundary points for the start and end of the scroll bar are added to the boundary data structure to create an empty and initialized boundary data structure.

Next, an establish new boundaries routine 320 is called to create new boundaries, and consequently, new regions of the scroll bar. Upon completion of this routine, redraw scroll bar routine 160 is called to redraw the scroll bar and update the displayed boundaries therefor. After the scroll bar is redrawn, routine 310 is complete.

Routine 320 is illustrated in greater detail in FIG. 16. Routine 320 principally operates by defining boundaries in the scroll bar at selected locations where the user has changed direction in scrolling during navigation of the document associated therewith. Based upon the frequency of access to the various regions defined between the boundaries, each region is scaled relative to the other regions to expand more frequently utilized regions by decreasing the rate of scroll associated therewith. Less frequently used regions are contracted relative to other regions such that the rate of scroll associated therewith is increased.

Routine 320 begins in block 322 by retrieving the points from the point list that indicate a change of direction in navigation by the user. For each of these change of direction points, a new boundary point is added to the boundary data structure. Next, in block 324, a slider track line is plotted between the various points in the point list.

As an example of the operation of blocks 322 and 324, for example, FIG. 17 illustrates a scroll bar 400 having a slider 401 and initially having start and end boundary points 402 and 404. A slider track line is illustrated at 430, with various points 431, 432, 433, 434, 435, 436, 437 and 438 disposed along the line, and with the horizontal separation of the points being generally representative of the relative points in time of each of the points. As shown in FIG. 17, the change of direction points from the navigation history of the user include points 431, 433, 434, 435 and 437. As a result, boundary points 406, 408, 410, 412, 414 and 416 are defined on scroll bar 400. Initially, each boundary point will have the scroll bar position and document position associated therewith set to provide a uniform rate of scroll across the entire length of scroll bar 400. Specifically, each document position stored for each boundary point will represent the same relative location in the document as the scroll bar position is relative to the scroll bar.

Returning to FIG. 16, after a slider track line has been plotted, control passes to block 326 to compute an intermediate point within each region defined between each of the boundary points. For example, the midpoint of each region may be calculated for each region in a manner well known in the art. Based upon these midpoints, block 328 is executed to determine the number of crossings of the slider track line with each of the midpoints.

For example, as shown in FIG. 18, the boundary points established for scroll bar 400 establish a plurality of regions 421, 422, 423, 424, 425, 426 and 427 on the scroll bar. The midpoints of each region are represented respectively by lines 421a, 422a, 423a, 424a, 425a, 426a and 427a. By detecting the intersection of track line 430 with each of the midpoints 421a–427a, the number of crossings within each region may be calculated. In the illustrated example, regions 421 and 427 have zero crossings, region 422 has one crossing, regions 424 and 426 have two crossings, region 423 has three crossings and region 425 has four crossings.

Returning to FIG. 16, the number of crossings for each region is then used in block 330 to calculate a region expansion factor for each region. The expansion factor may be calculated in a number of manners, typically by using an expansion factor function that calculates an expansion factor based on the number of crossings in the region. FIG. 19 illustrates a step function implementation 440 of an expansion factor function, where a step function is defined to calculate the amount that each region is expanded relative to other regions. Step function 440, for example, utilizes a zero expansion factor for zero to two crossings, a twenty percent expansion factor for three to five crossings, a forty percent expansion factor for six to eight crossings, and a sixty percent expansion factor for nine or more crossings. Using the slider track line illustrated in FIG. 18, therefore, regions 423 and 425 would have twenty percent expansion factors, with the remaining regions each having zero percent expansion factors.

Returning to FIG. 16, once the expansion factor for each region is calculated, block 332 is executed to combine adjacent regions having identical expansion factors. As shown in FIG. 20, for example, regions 421 and 422 would be combined into a new region 428, and regions 426 and 427 could be combined into a new region 429. The combination of adjacent regions may be performed simply by removing the boundary therebetween from the boundary data structure, in this case, boundaries 406 and 408.

Returning again to FIG. 16, once adjacent regions have been combined, an expand regions routine 340 is called to expand each of the regions based upon its relative expansion factor. After execution of routine 340, routine 320 is complete.

Figure 21:
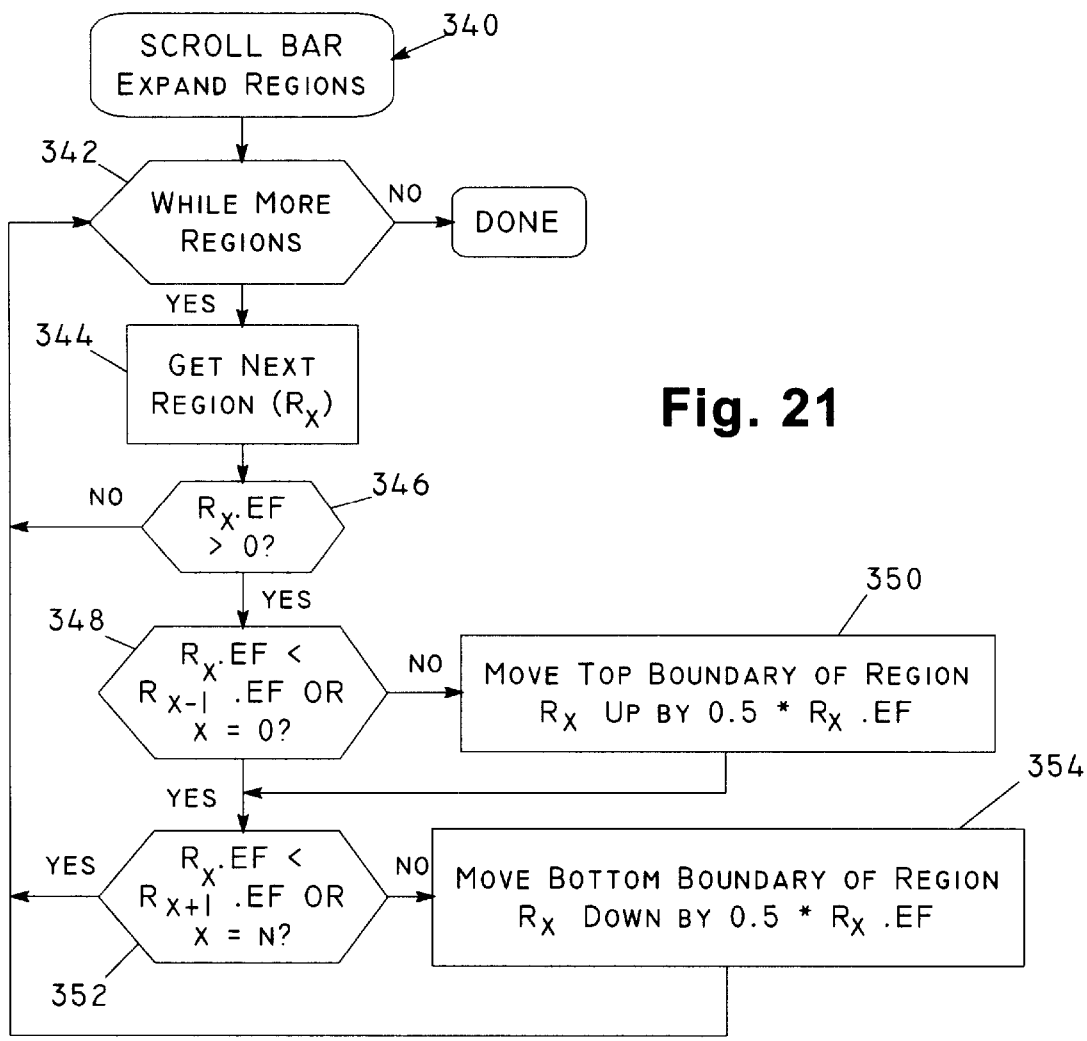
FIG. 21 is a flowchart illustrating the program flow of the expand regions routine of FIG. 16.

One implementation of an expand regions routine 340 is illustrated in greater detail in FIG. 21. Routine 340 begins in block 342 by executing a while loop that performs a sequence of operations for each region remaining for the scroll bar. As long as additional regions remain to be processed, block 342 passes control to block 344 to obtain the next region, designated herein as $R_x$. Next, block 346 determines whether the expansion factor (EF) for this region is greater than zero. If not, control is returned to block 342 to process the next region in the scroll bar. If, however, the expansion factor is greater than zero, control is passed to block 348 to determine (1) whether the expansion factor for the current region ($R_x$) is less than the expansion factor for the immediately preceding region ($R_{x-1}$), or (2) whether the current region is the first region of the scroll bar (X=0). If neither condition is true, control is passed to block 350 to move the top boundary of the region up by a relative amount equal to one-half of the expansion factor for the region.

If either of the conditions specified in block 348 is true, or after execution of block 350, control passes to block 352 to determine (1) whether the expansion factor for the current region is less than that of the immediately succeeding region, or (2) whether the current region is the last region in the scroll bar (X=n). If either condition is true, control is diverted to block 342 to process additional regions. If, however, neither condition is true, control is passed to block 354 to move the bottom boundary of the region down by one-half of the expansion factor. Control is then passed to block 342 to process additional regions.

The process of moving a boundary of a region is typically performed by adjusting the scroll bar position thereof while maintaining the document position for the boundary with a fixed value. In the alternative, it may be desirable to adjust the document position of a boundary relative to a fixed scroll bar position.

Continuing with the illustrated example, FIG. 20 illustrates how each of regions 423 and 425 would be adjusted by routine 340, where the top and bottom boundaries 414, 416 of region 423 would each be moved at a distance equal to ten percent of the size of the region to positions 414' and 416' illustrated in FIG. 20. Similarly, for region 425, boundaries 410, 412 would be adjusted the same relative amount from the positions shown at 410, 412 to the new positions shown at 410', 412'. However, since the absolute size of region 425 is larger than region 423, the absolute variation in the boundaries of region 425 exceed that of the boundaries in region 423.

Figure 22:
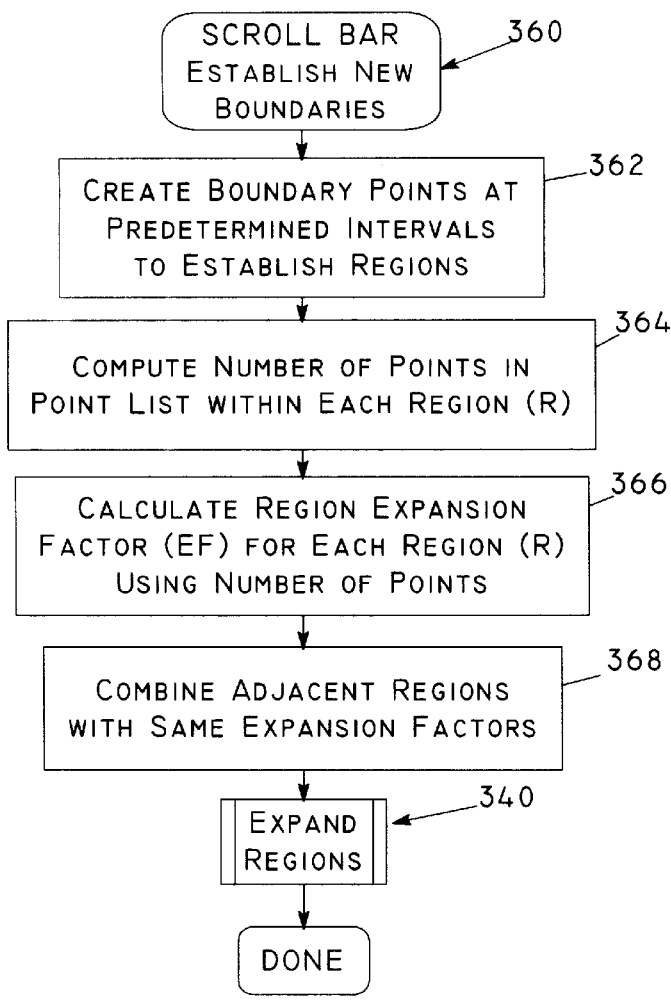
FIG. 22 is a flowchart illustrating the program flow of an alternate establish new boundaries routine to that shown in FIG. 16.

Any number of alternate manners may be used to perform dynamic adjustment of boundaries consistent with the invention. For example, FIG. 22 illustrates an alternate establish new boundaries routine 360 to that described above with reference to FIG. 16. In this alternate routine, regions are defined at predetermined intervals along the scroll bar, with the number of points in the point list found within each region defined between the boundaries used to calculate the relative expansion factor for each region.

As shown in FIG. 22, for example, routine 360 begins at block 362 by creating a plurality of boundary points at predetermined intervals along the scroll bar to establish a plurality of equally spaced regions. Next, block 364 computes the number of points in the point list that are disposed within each region. Next, block 366 calculates a region expansion factor for each region based upon the number of points disposed therein. Any of the expansion factor functions described above with reference to routine 320 may be used.

Upon calculation of the region expansion factor for each region, block 368 combines adjacent regions with the same expansion factors, in the same manner as block 323 of routine 320. Next, the expand regions routine 340 is called to perform the expansion of regions in the manner described above.

Figure 23:
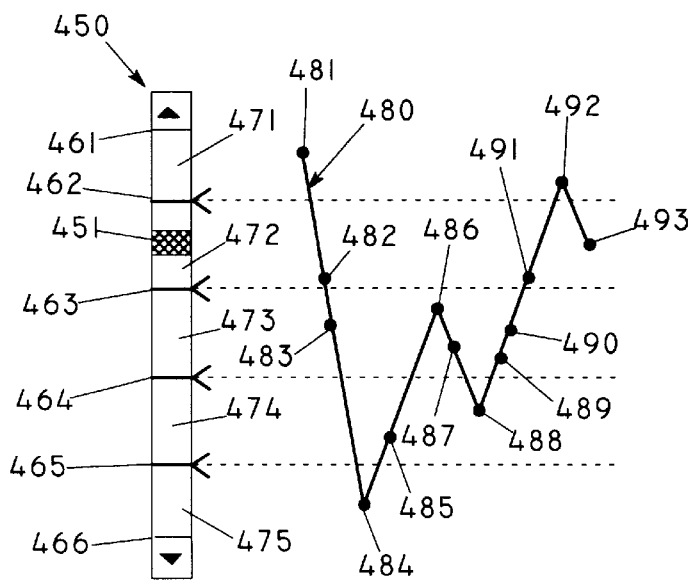
FIG. 23 is a block diagram of the establishment of boundaries in a scroll bar using the establish new boundaries routine of FIG. 22.

FIG. 23 illustrates the operation of routine 360 on a scroll bar 450 having a slider 451 and a plurality of regions 471, 472, 473, 474 and 475 defined by a plurality of boundaries 461, 462, 463, 464, 465 and 466. An exemplary point list is illustrated at 480, including points 481, 482, 483, 484, 485, 486, 487, 488, 489, 490, 491, 492 and 493. Utilizing this navigation history, block 364 of routine 360 would calculate two points in region 471, three points in region 472, five points in region 473, two points in region 474 and one point in region 475. Assuming, for example, that the same step function is used to calculate the expansion factor for each region, it may be seen that region 473 would have a twenty percent expansion factor with the remainder of regions having zero expansion factors. In addition, block 368 would combine regions 471 and 472 by eliminating boundary 462, as well as combine regions 474 and 475 by eliminating boundary 465. By virtue of the expand regions routine 340, the relative size of region 473 would then be expanded twenty percent relative to the other regions on scroll bar 450.

It should be appreciated that various additional modifications may be made to the illustrated embodiment without departing from the spirit and scope of the invention. For example, security issues may be addressed by the above-described non-linear scroll bar, e.g., by compacting locked-out regions of a document by setting a relatively high rate of scroll for those regions such that the regions are essentially inaccessible to a user via the scroll bar. Moreover, those regions could be blanked out to prohibit viewing thereof, and the scroll bar regions corresponding thereto could be visually distinguished to illustrate the locked status thereof. In some applications, for example, adjacent boundaries defining an unaccessible region of a document may be set to have the same scroll bar position, but with document positions that bound the unaccessible region. Through the use of additional decision logic that detects equal scroll bar positions (which also may be required to prevent divide-by-zero errors, since the denominator of the rate of scroll calculation is typically the difference in scroll bar positions of adjacent boundaries), an unaccessible region may be detected and separately handled by the system to uniquely display the region so as to prevent access thereto by a user.

In addition, it should be appreciated that other scroll bar designs may be utilized, e.g., including different types of controls or being responsive to different user input. Furthermore, a scroll bar need not be adjacent to or housed within a particular window with which it is associated. A window may also represent a full-screen representation, so long as a document displayed or the display is accessed via a scroll bar.

Various additional modifications may be made to the above-described embodiments without departing from the spirit and scope of the invention. Therefore, the invention lies solely in the claims hereinafter appended.

What is claimed is:

1. A method of displaying a document on a computer display, the method comprising:
    (a) displaying at least a portion of a document in a window on a computer display, the document including at least first and second regions; and
    (b) displaying a scroll bar on the computer display, the scroll bar including at least first and second regions, the first region of the scroll bar mapped to the first region of the document to provide a first rate of scroll, and the second region of the scroll bar mapped to the second region of the document to provide a second rate of scroll, wherein the first and second rates of scroll are different.

2. The method of claim 1, further comprising selectively updating the current portion of the document displayed in the window in response to user manipulation of the scroll bar.

3. The method of claim 2, wherein displaying the scroll bar includes displaying the scroll bar along a perimeter of the window.

4. The method of claim 2, wherein displaying the scroll bar includes visually distinguishing the first and second regions.

5. The method of claim 4, wherein visually distinguishing the first and second regions includes rendering a boundary display element delineating the first and second regions.

6. The method of claim 4, wherein visually distinguishing the first and second regions includes rendering the first and second regions with first and second visual representations.

7. The method of claim 6, wherein the first and second visual representations are distinguished in a manner selected from the group consisting of shading, coloring, patterning, displaying an icon, displaying alphanumeric information, and combinations thereof.

8. The method of claim 2, wherein displaying the scroll bar includes displaying a slider on the scroll bar, the slider including a current scroll bar position on the scroll bar that is associated with a current document position for the document displayed in the window.

9. The method of claim 8, wherein the scroll bar is vertically aligned to scroll the document vertically through the window, and wherein the current document position for the document is that which is currently displayed at the top of the window.

10. The method of claim 8, wherein selectively updating the current portion of the document displayed in the window includes:
   (a) scrolling through the document at the first rate of scroll in response to user manipulation of the slider when the slider is disposed in the first region of the scroll bar; and
   (b) scrolling through the document at the second rate of scroll in response to user manipulation of the slider when the slider is disposed in the second region of the scroll bar.

11. The method of claim 8, further comprising defining the first and second regions of the scroll bar by establishing at least one boundary delineating each region, each boundary having associated therewith a document position and a scroll bar position.

12. The method of claim 11, wherein each region is defined between a pair of boundaries, wherein the rate of scroll for each region is defined as the ratio of the difference between the document positions for the pair of boundaries to the difference between the scroll bar positions for the pair of boundaries.

13. The method of claim 12, wherein selectively updating the current portion of the document displayed in the window includes, in response to user manipulation of the slider to a predetermined scroll bar position on the scroll bar:
   (a) determining immediately preceding and succeeding boundaries for the predetermined scroll bar position;
   (b) determining a scroll bar offset from the predetermined scroll bar position to the scroll bar position for the immediately preceding boundary;
   (c) scaling the scroll bar offset by the rate of scroll defined for the region delineated by the immediately and succeeding boundaries to define a document offset; and
   (d) summing the document offset with the document position for the immediately preceding boundary to determine the current document position.

14. The method of claim 8, further comprising dynamically defining the first and second regions of at least one of the document and the scroll bar.

15. The method of claim 14, wherein dynamically defining includes defining the first and second regions of the document and of the scroll bar in response to a history of user manipulation of the scroll bar.

16. The method of claim 15, wherein dynamically defining further includes tracking a navigation history for a user.

17. The method of claim 16, wherein dynamically defining further includes:
   (a) creating a plurality of boundaries, each boundary having associated therewith a document position and a scroll bar position, wherein each adjacent pair of boundaries defines a document region and a scroll bar region; and
   (b) based upon the navigation history for the user, adjusting at least one of the document and scroll bar positions of selected boundaries to emphasize more frequently navigated regions.

18. The method of claim 17, wherein creating a plurality of boundaries includes:
   (a) retrieving from the navigation history a set of directional change positions, each of which being representative of a scroll bar position in which a direction of navigation was reversed by a user; and
   (b) creating a boundary for each directional change position.

19. The method of claim 17, wherein creating a plurality of boundaries includes creating a plurality of evenly-spaced boundaries, each having evenly-spaced document and scroll bar positions relative to other boundaries.

20. The method of claim 17, wherein adjusting at least one of the document and scroll bar positions of selected boundaries includes:
   (a) determining from the navigation history a frequency of navigation associated with each pair of boundaries;
   (b) determining an expansion factor for each pair of boundaries based upon the associated frequency of navigation; and
   (c) adjusting at least one of the document and scroll bar positions for selected boundaries based upon the expansion factors determined for each pair of boundaries.

21. A method of setting a value in a computer system using a graphical user interface environment, the method comprising:
   (a) displaying a scroll bar on the computer display, the scroll bar associated with a variable having associated therewith a range of values, the range of values including first and second subranges, and the scroll bar including at least first and second regions, the first region of the scroll bar mapped to the first subrange to provide a first rate of scroll, and the second region of the scroll bar mapped to the second subrange to provide a second rate of scroll, wherein the first and second rates of scroll are different; and
   (b) selectively updating the variable in response to user manipulation of the scroll bar.

22. A user interface component configured to be displayed on a computer display to receive user input for manipulating a window displayed on the computer display, the window of the type having at least a portion of a document displayed therein, the document including at least first and second regions, the user interface component comprising:
   (a) a scroll bar display element displayed on the computer display; and
   (b) first and second regions defined on the scroll bar display element, the first region mapped to the first region of the document to provide a first rate of scroll, and the second region mapped to the second region of the document to provide a second rate of scroll, wherein the first and second rates of scroll are different.

23. The user interface component of claim 22, further comprising a user control displayed on the computer display in association with the scroll bar display element, the user control responsive to user input to update the current portion of the document displayed in the window.

24. The user interface component of claim 23, wherein the scroll bar display element is displayed along a perimeter of the window.

25. The user interface component of claim 23, wherein the first and second regions of the scroll bar display element are respectively displayed in first and second visually distinguishable representations.

26. The user interface component of claim 23, further comprising a boundary display element delineating the first and second regions of the scroll bar display element.

27. The user interface component of claim 23, wherein the user control comprises a slider including a current scroll bar position on the scroll bar display element that is associated with a current document position for the document displayed in the window.

28. The user interface component of claim 27, wherein the slider is configured to scroll the portion of the document displayed in the window at the first rate of scroll in response to user manipulation of the slider when the slider is disposed in the first region of the scroll bar display element, and to scroll the portion of the document displayed in the window at the second rate of scroll in response to user manipulation of the slider when the slider is disposed in the second region of the scroll bar display element.

29. The user interface component of claim 27, further comprising at least one boundary delineating the first and second regions of the scroll bar display element, each boundary having associated therewith a document position and a scroll bar position.

30. The user interface component of claim 29, wherein each region is defined between a pair of boundaries, wherein the rate of scroll for each region is defined as the ratio of the difference between the document positions for the pair of boundaries to the difference between the scroll bar positions for the pair of boundaries.

31. The user interface component of claim 23, wherein the rate of scroll for each region is dynamically adjustable in response to a user navigation history.

32. A computer system, comprising:
  (a) a computer display; and
  (b) a processor, coupled to the computer display, the processor configured to display a window on the computer display; to display at least a portion of a document in the window, the document including at least first and second regions; and to display a scroll bar on the computer display, the scroll bar including at least first and second regions, the first region of the scroll bar mapped to the first region of the document to provide a first rate of scroll, and the second region of the scroll bar mapped to the second region of the document to provide a second rate of scroll, wherein the first and second rates of scroll are different.

33. The computer system of claim 32, wherein the processor is further configured to selectively update the current portion of the document displayed in the window in response to user manipulation of the scroll bar.

34. The computer system of claim 33, wherein the processor is further configured to display the scroll bar along a perimeter of the window.

35. The computer system of claim 33, wherein the processor is further configured to display the scroll bar with the first and second regions visually distinguished.

36. The computer system of claim 35, wherein the processor is further configured to display a boundary display element delineating the first and second regions of the scroll bar.

37. The computer system of claim 35, wherein the processor is further configured to render the first and second regions with first and second visual representations.

38. The computer system of claim 33, wherein the processor is further configured to display a slider on the scroll bar, the slider including a current scroll bar position on the scroll bar that is associated with a current document position for the document displayed in the window.

39. The computer system of claim 38, wherein the processor is further configured to:
  (a) scroll through the document at the first rate of scroll in response to user manipulation of the slider when the slider is disposed in the first region of the scroll bar; and
  (b) scroll through the document at the second rate of scroll in response to user manipulation of the slider when the slider is disposed in the second region of the scroll bar.

40. The computer system of claim 38, wherein the processor is further configured to define the first and second regions of the scroll bar by establishing at least one boundary delineating each region, each boundary having associated therewith a document position and a scroll bar position.

41. The computer system of claim 33, wherein the processor is further configured to dynamically define the first and second regions of at least one of the document and the scroll bar.

42. The computer system of claim 41, wherein the processor is further configured to track a navigation history for a user, and in response to the navigation history, to define the first and second regions of the document and of the scroll bar.

43. The computer system of claim 41, wherein the processor is further configured to create a plurality of boundaries, each boundary having associated therewith a document position and a scroll bar position, wherein each adjacent pair of boundaries defines a document region and a scroll bar region; and based upon the navigation history for the user, to adjust at least one of the document and scroll bar positions of selected boundaries to emphasize more frequently navigated regions.

44. A program product, comprising:
  (a) a program configured to perform a method of displaying a document on a computer display, the method comprising:
    (1) displaying at least a portion of a document in a window on a computer display, the document including at least first and second regions; and
    (2) displaying a scroll bar on the computer display, the scroll bar including at least first and second regions, the first region of the scroll bar mapped to the first region of the document to provide a first rate of scroll, and the second region of the scroll bar mapped to the second region of the document to provide a second rate of scroll, wherein the first and second rates of scroll are different; and
  (b) a signal bearing media bearing the program.

45. The program product of claim 44, wherein the signal bearing media comprises a recordable type media.

46. The program product of claim 44, wherein the signal bearing media comprises transmission type media.

47. A method of setting a value in a computer system using a graphical user interface environment, the method comprising:
  (a) displaying a scroll bar on the computer display, the scroll bar including a plurality of scroll bar positions defined on the scroll bar, the scroll bar associated with a variable having associated therewith a range of values, wherein the plurality of scroll bar positions defined on the scroll bar are mapped to the range of values via a non-linear mapping;
  (b) displaying a slider on the scroll bar at a current scroll bar position among the plurality of scroll bar positions; and
  (c) determining one of a current value for the variable and the current scroll bar position from the other of the current value and the current scroll bar position based upon the non-linear mapping defined for the scroll bar.

48. The method of claim 47, wherein the variable represents a document position in a document, the method further comprising displaying at least a portion of the document in a window on the computer display.

49. The method of claim 47, wherein the non-linear mapping is defined by first and second rates of scroll, the first and second rates of scroll being different from one another, the first rate of scroll provided by mapping a first subrange in the range of values for the variable to a first region of the scroll bar, and the second rate of scroll provided by mapping a second subrange in the range of values for the variable to a second region of the scroll bar.

50. The method of claim 49, wherein the first and second rates of scroll are respectively uniform throughout the first and second regions of the scroll bar.

51. A method of displaying a document on a computer display, the method comprising:
   (a) displayig at least a portion of a document in a window on a computer display, the document including at least first and second regions, each region of the document bounded by a pair of document positions; and
   (b) displaying a scroll bar on the computer display, the scroll bar including at least first and second regions, each region of the scroll bar bounded by a pair of scroll bar positions, the first region of the scroll bar mapped to the first region of the document to provide a first rate of scroll associated with the ratio of the difference between the pair of document positions for the first region of the document to the difference betweeen the pair of scroll bar positions for the first region of the scroll bar, and the second region of the scroll bar mapped to the second region of the document to provide a second rate of scroll associated with the ratio of the difference between the pair of document positions for the second region of the document to the difference between the pair of scroll bar positions for the second region of the scroll bar, wherein the first and second rates of scroll are different.

52. A method of setting a value in a computer system using a graphical user interface environment, the method comprising:
   (a) displaying a scroll bar on the computer display, the scroll bar associated with a variable having associated therewith a range of values, the range of values including first and second subranges, each subrange of the range of values bounded by a pair of values, and the scroll bar including at least first and second regions, each region of the scroll bar bounded by a pair of scroll bar positions, the first region of the scroll bar mapped to the first subrange to provide a first rate of scroll associated with the ratio of the difference between the pair of values for the first subrange to the difference between the pair of scroll bar positions for the first region, and the second region of the scroll bar mapped to the second subrange to provide a second rate of scroll associated with the ratio of the difference between the pair of values for the second subrange to the difference between the pair of scroll bar positions for the second region, wherein the first and second rates of scroll are different; and
   (b) selectively updating the variable in response to user manipulation of the scroll bar.

53. A user interface component configured to be displayed on a computer display to receive user input for manipulating a window displayed on the computer display, the window of the type having at least a portion of a document displayed therein, the document including at least first and second regions, each region of the document bounded by a pair of document positions, the user interace component comprising:
   (a) a scroll bar display element displayed on the computer display; and
   (b) first and second regions defined on the scroll bar display element, each region of the scroll bar bounded by a pair of scroll bar positions, the first region of the scroll bar mapped to the first region of the document to provide a first rate of scroll associated with the ratio of the difference between the pair of document positions for the first region of the document to the difference between the pair of scroll bar positions for the first region of the scroll bar, and the second region of the scroll bar mapped to the second region of the document to provide a second rate of scroll associated with the ratio of the difference between the pair of document positions for the second region of the document to the difference between the pair of scroll bar positions for the second region of the scroll bar, wherein the first and second rates of scroll are different.

54. A computer system, comprising:
   (a) a computer display; and
   (b) a processor, coupled to the computer display, the processor configured to display a window on the computer display; to display at least a portion of a document in the window, the document including at least first and second regions, each region of the document bounded by a pair of document positions; and to display a scroll bar on the computer display, the scroll bar including at least first and second regions, each region of the scroll bar bounded by a pair of scroll bar positions, the first region of the scroll bar mapped to the first region of the document to provide a first rate of scroll associated with the ratio of the difference between the pair of document positions for the first region of the document to the difference between the pair of scroll bar positions for the first region of the scroll bar, and the second region of the scroll bar mapped to the second region of the document to provide a second rate of scroll associated with the ratio of the difference between the pair of document positions for the second region of the document to the difference between the pair of scroll bar positions for the second region of the scroll bar, wherein the first and second rates of scroll are different.

55. A program product, comprising:
   (a) a program configured to perform a method of displaying a document on a computer display, the method comprising:
      (1) displaying at least a portion of a document in a window on a computer display, the document including at least first and second regions, each region of the document bounded by a pair of document positions; and
      (2) displaying a scroll bar on the computer display, the scroll bar including at least first and second regions, each region of the scroll bar bounded by a pair of scroll bar positions, the first region of the scroll bar mapped to the first region of the document to provide a first rate of scroll associated with the ratio of the difference between the pair of document positions for the first region of the document to the difference between the pair of scroll bar positions for the first region of the scroll bar, and the second region of the scroll bar mapped to the second region of the document to provide a second rate of scroll associated with the ratio of the difference between the pair of document positions for the second region of the document to the difference between the pair of scroll bar positions for the second region of the scroll bar, wherein the first and second rates of scroll are different; and (b) a signal bearing media bearing the program.

* * * * *